United States Patent
Suda

(10) Patent No.: US 10,443,532 B2
(45) Date of Patent: Oct. 15, 2019

(54) FUEL INJECTION CONTROL DEVICE AND METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Toru Suda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/868,072

(22) Filed: Jan. 11, 2018

(65) Prior Publication Data

US 2018/0216565 A1 Aug. 2, 2018

(30) Foreign Application Priority Data

Jan. 27, 2017 (JP) ................. 2017-013408

(51) Int. Cl.
*F02D 41/26* (2006.01)
*F02D 41/40* (2006.01)
(Continued)

(52) U.S. Cl.
CPC ....... *F02D 41/263* (2013.01); *F02D 41/3809* (2013.01); *F02D 41/40* (2013.01); *F02M 51/04* (2013.01); *F02M 63/0007* (2013.01); *F02D 41/0082* (2013.01); *F02D 41/3094* (2013.01); *F02D 2041/3881* (2013.01); (Continued)

(58) Field of Classification Search
CPC .... F02D 41/263; F02D 41/3809; F02D 41/40; F02D 41/0082; F02D 41/3094; F02D 51/04; F02D 63/0007; F02D 2041/3881; F02D 2200/0602; F02D 2200/0604;
(Continued)

(56) References Cited

U.S. PATENT DOCUMENTS

2016/0076475 A1* 3/2016 Suzuki .............. F02M 63/0225
123/445
2016/0090955 A1* 3/2016 Yuasa ................. F02M 69/046
123/457
(Continued)

FOREIGN PATENT DOCUMENTS

JP 2000-213435 A 8/2000
JP 2007-270682 A 10/2007
(Continued)

*Primary Examiner* — Mahmoud Gimie
(74) *Attorney, Agent, or Firm* — Oliff PLC

(57) ABSTRACT

A fuel injection control device includes processing circuitry, which executes an estimating process to estimate pressure in first and second fuel storage members connected to first and second fuel injection valves. The estimating process includes: estimating the pressure in the first fuel storage member based on a detection value of a pressure sensor that detects the pressure in the first fuel storage member and a cycle of pulsation in the first fuel storage member, which is determined in accordance with an interval of fuel injections in a first bank; and estimating the pressure in the second fuel storage member by assuming that a phase of a periodic fluctuation of the pressure in the second fuel storage member and a phase of a periodic fluctuation of the pressure in the first fuel storage member are in antiphase.

8 Claims, 10 Drawing Sheets

(51) Int. Cl.
- *F02M 63/00* (2006.01)
- *F02M 51/04* (2006.01)
- *F02D 41/38* (2006.01)
- *F02D 41/00* (2006.01)
- *F02D 41/30* (2006.01)

(52) U.S. Cl.
CPC ........ *F02D 2200/0602* (2013.01); *F02D 2200/0604* (2013.01); *F02D 2200/0606* (2013.01); *F02D 2200/101* (2013.01); *F02D 2250/04* (2013.01)

(58) Field of Classification Search
CPC ....... F02D 2200/0606; F02D 2200/101; F02D 2250/04
USPC ................................................ 123/456, 480
See application file for complete search history.

(56) References Cited

U.S. PATENT DOCUMENTS

| | | |
|---|---|---|
| 2017/0211501 A1 | 7/2017 | Tachibana et al. |
| 2017/0211502 A1 | 7/2017 | Tachibana et al. |
| 2017/0211503 A1 | 7/2017 | Tachibana et al. |

FOREIGN PATENT DOCUMENTS

| | | |
|---|---|---|
| JP | 2014-222029 A | 11/2014 |
| JP | 2017-133419 A | 8/2017 |
| JP | 2017-133420 A | 8/2017 |
| JP | 2017-133421 A | 8/2017 |

\* cited by examiner

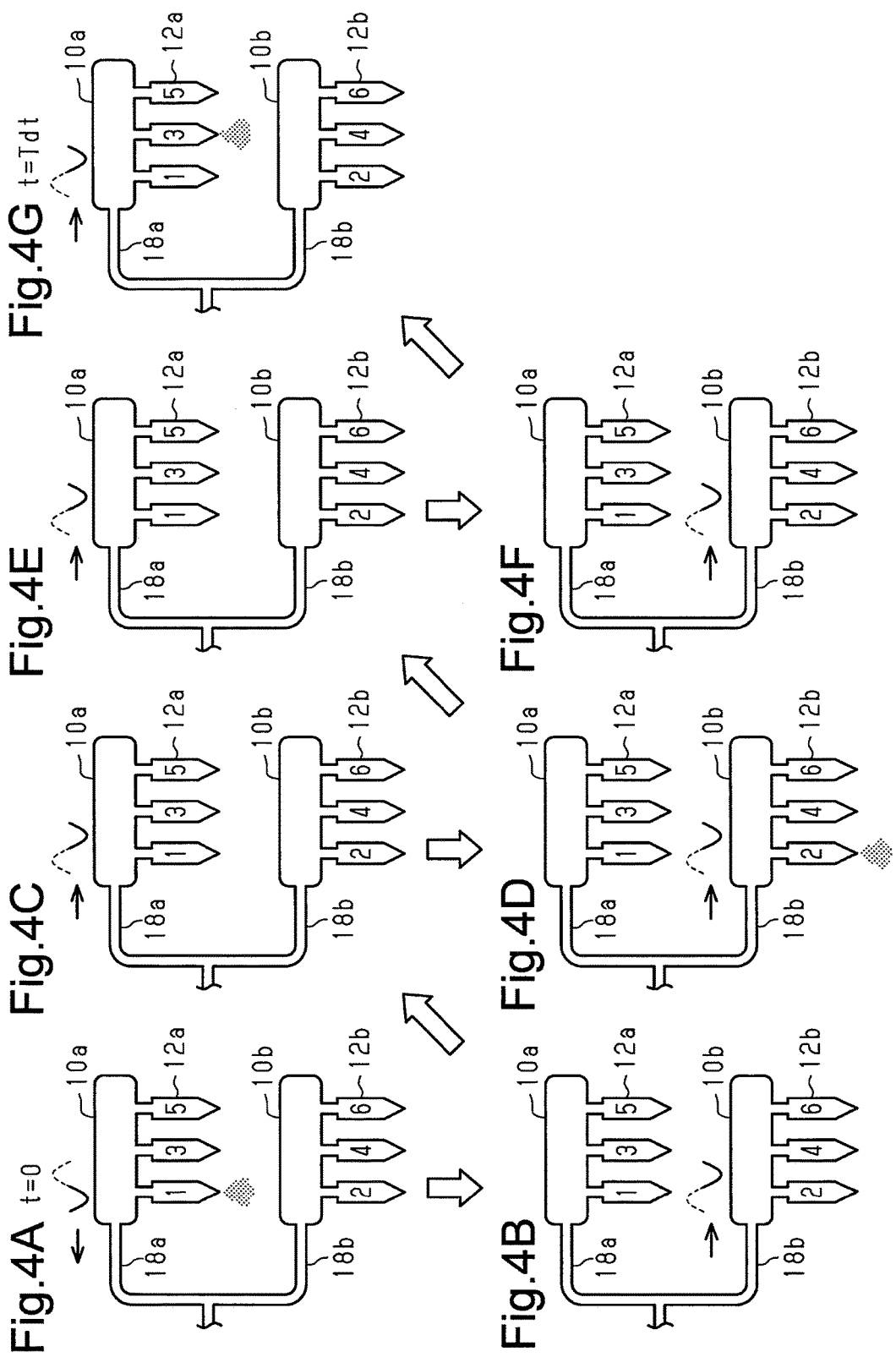

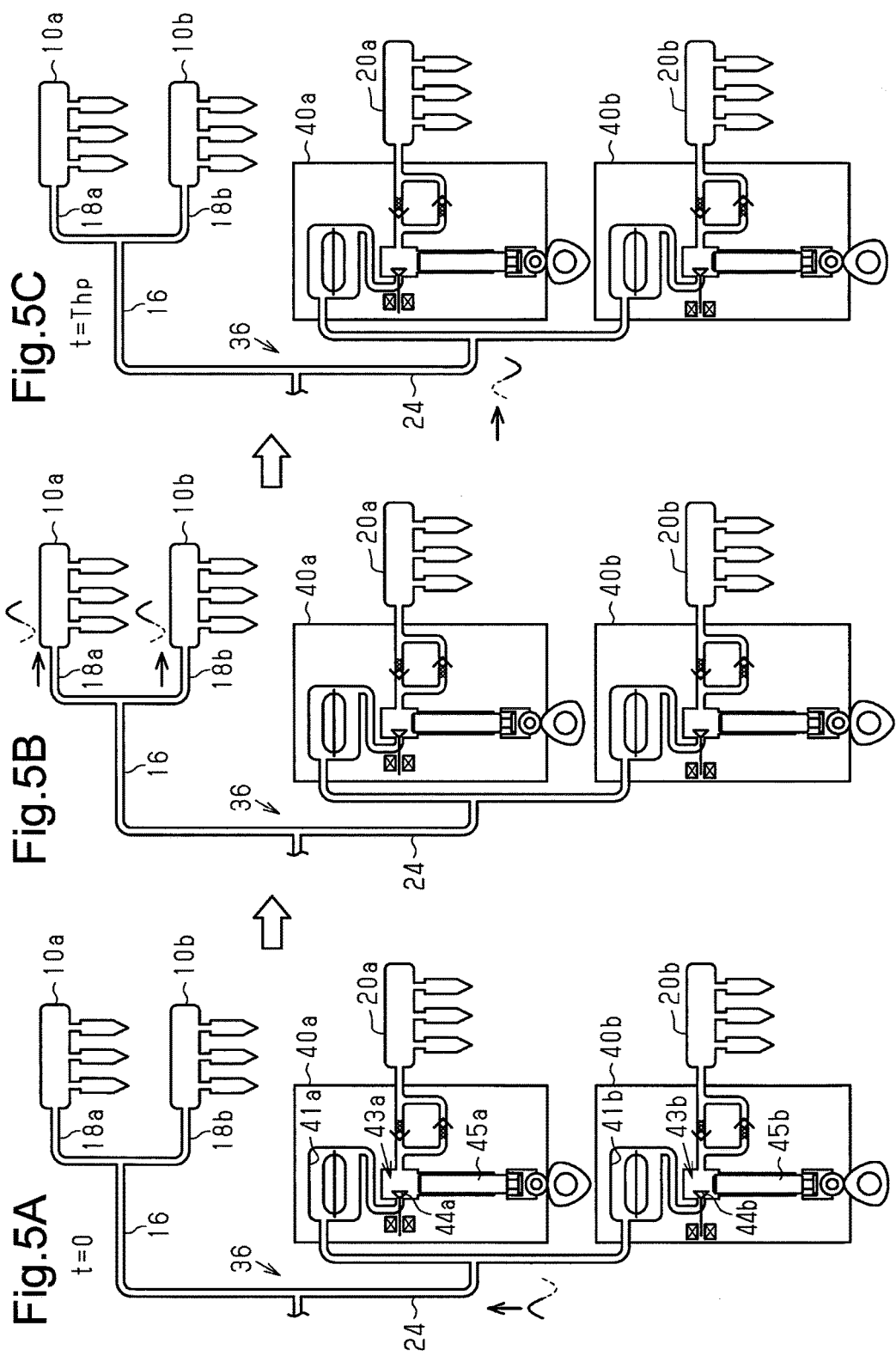

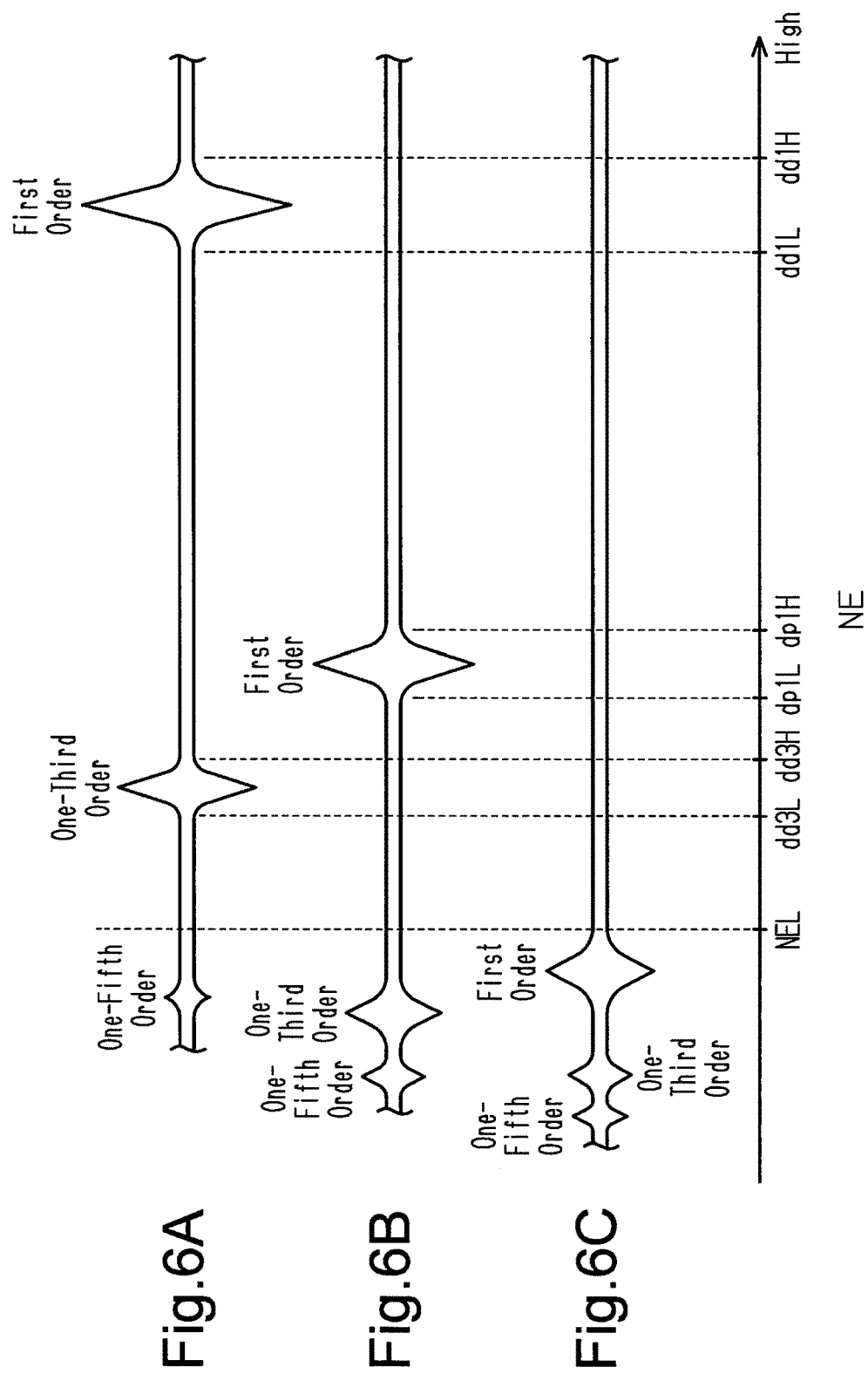

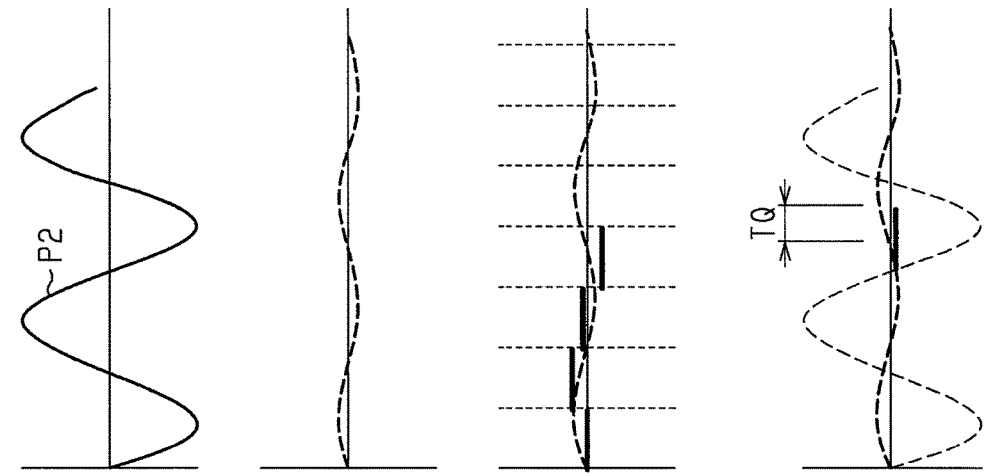
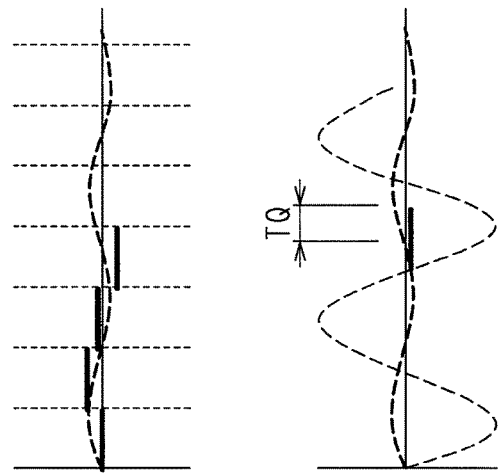
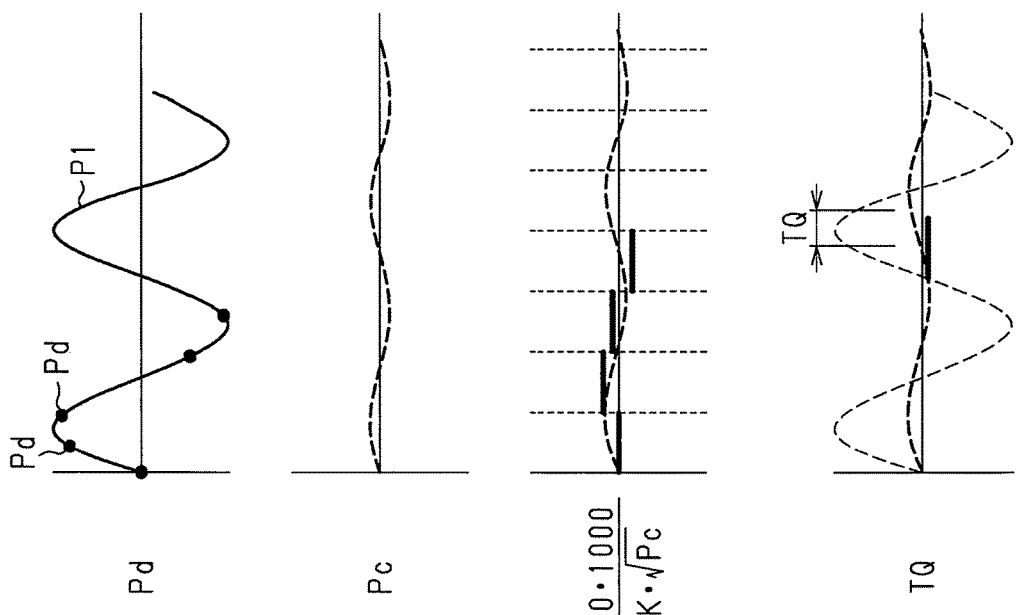
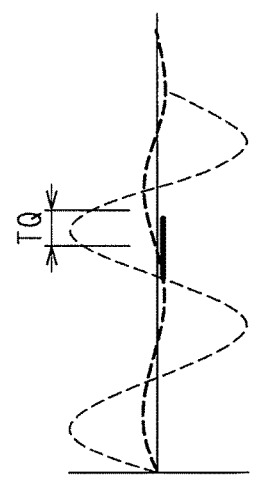
Fig.9A
Fig.9B
Fig.9C
Fig.9D

FUEL INJECTION CONTROL DEVICE AND METHOD FOR INTERNAL COMBUSTION ENGINE

BACKGROUND

The present disclosure relates to a fuel injection control device and method for an internal combustion engine.

For example, Japanese Laid-Open Patent Publication No. 2014-222029 discloses a configuration for a V6 engine that includes a port injection valve configured to supply fuel to three cylinders and another port injection valve configured to supply fuel to the remaining three cylinders. The port injection valves are respectively supplied with fuel by a first fuel storage member and a second fuel storage member, which are different low-pressure-side delivery pipes. The internal combustion engine has a pressure sensor configured to detect the pressure in the first fuel storage member and operates the port injection valves connected to the first fuel storage member and the second fuel storage member based on the detection value of the pressure sensor.

In the above-described configuration, fuel injection of the port injection valve that is connected to one of the first fuel storage member and the second fuel storage member causes a pressure pulsation, which propagates in a reciprocating manner between the first fuel storage member and the second fuel storage member. When this pressure pulsation is intensified by a pressure pulsation caused by fuel injection of the port injection valve connected to the other fuel storage member, resonance occurs, which increases the pressure pulsation. Moreover, the inventors found out that the pressure pulsation in the first fuel storage member and the pressure pulsation in the second fuel storage member are in antiphase. Thus, the accuracy of fuel injection will be reduced if the port injection valves, which are respectively connected to the first fuel storage member and the second fuel storage member, are operated using the pressure detected by the pressure sensor on the assumption that the pressures in the first fuel storage member and the pressure in the second fuel storage member are equal to each other.

SUMMARY

It is an objective of the present disclosure to provide a fuel injection control device and method for an internal combustion engine that maintain a high accuracy of fuel injection even when a resonance phenomenon is occurring due to propagation of a pressure pulsation between a first fuel storage member and a second fuel storage member.

Examples of the present disclosure will now be described.

Example 1

A fuel injection control device for an internal combustion engine is provided. The internal combustion engine includes a first bank having a first cylinder, a second bank having a second cylinder, a first fuel injection valve configured to supply fuel to the first cylinder, a second fuel injection valve configured to supply fuel to the second cylinder, a first fuel storage member, which is connected to the first fuel injection valve and is configured to store fuel to be supplied to the first fuel injection valve, a second fuel storage member, which is connected to the second fuel injection valve and is configured to store fuel to be supplied to the second fuel injection valve, wherein the second fuel storage member is different from the first fuel storage member and communicates with the first fuel storing member, and a pressure sensor configured to detect a fuel pressure in the first fuel storage member. The fuel injection control device comprising processing circuitry that is configured to execute: an estimating process to estimate fuel pressure in the first fuel storage member and fuel pressure in the second fuel storage member; and an injection valve operating process to operate the first and second fuel injection valves such that, when pressure in a fuel injection period that is the pressure estimated in the estimating process is high, the fuel injection period is shorter than when the pressure in the fuel injection period is low. The estimating process includes an antiphase estimating process, which includes: estimating the fuel pressure in the first fuel storage member based on a detection value of the pressure sensor and a cycle of pulsation in the first fuel storage member, which is determined in accordance with an interval of fuel injections in the first bank; and estimating the fuel pressure in the second fuel storage member by assuming that a phase of a periodic fluctuation of the fuel pressure in the second fuel storage member and a phase of a periodic fluctuation of the fuel pressure in the first fuel storage member are in antiphase.

In a case in which a resonance phenomenon is occurring due to propagation of pressure pulsation between the first fuel storage member and the second fuel storage member due to fuel injection, the cycle of the pressure pulsation in the first fuel storage member is determined in accordance with the interval of the fuel injections in the first bank associated with the first fuel storage member. Thus, in the above-described configuration, the pressure in the first fuel storage member is estimated based on the interval of the fuel injections in the first bank in addition to the detection value of the pressure in the first fuel storage member. Also, in the above-described configuration, the pressure in the second fuel storage member is estimated by assuming that the phase of a periodic fluctuation of the pressure in the second fuel storage member and the phase of a periodic fluctuation of the pressure in the first fuel storage member are in antiphase. The first and second fuel injection valves are operated based on the estimated pressure. This makes it possible to maintain a high fuel injection accuracy even when a resonance phenomenon is occurring due to propagation of pressure pulsation between the first fuel storage member and the second fuel storage member.

Example 2

In the above-described fuel injection control device, the processing circuitry is configured to execute a speed acquiring process to acquire a rotational speed of a crankshaft of the internal combustion engine, and the processing circuitry is configured to use the pressure estimated in the antiphase estimating process in the injection valve operating process on condition that the rotational speed acquired in the speed acquiring process is in a predetermined range.

A resonance phenomenon occurs due to propagation of pressure pulsation between the first fuel storage member and the second fuel storage member due to fuel injection when, in the process of reciprocation of the pressure pulsation between the first fuel storage member and the second fuel storage member, the pressure pulsation and pressure pulsation due to other fuel injection intensify each other. While the speed at which pressure pulsation propagates between the first fuel storage member and the second fuel storage member is thought to be independent of the rotational speed of the crankshaft of the internal combustion engine, the time interval of fuel injections is directly dependent on the rotational speed. Thus, the resonance occurs when the rotational speed is in a predetermined region. Therefore, in the above-described configuration, when the rotational speed of the crankshaft is in a predetermined ration in which resonance phenomenon is expected to occur, the fuel injection valve is operated based on the pressure estimated in the antiphase estimating process.

Example 3

In the fuel injection control device of Example 2, the internal combustion engine includes a feed pump that supplies fuel to the first fuel storage member and the second fuel storage member. The processing circuitry is configured to execute: a target value varying process to variably set a target value of the pressure in the first and second fuel storage members; a pump operating process to operate the feed pump, thereby controlling the pressure in the first and second fuel storage members to become the target value; and a range varying process to set the predetermined range to a higher rotational speed range when the pressure in the first and second fuel storage members is high than when the pressure is low.

The inventors discovered that the propagation speed of pressure pulsation propagating between the first fuel storage member and the second fuel storage member tends to be higher when the fuel pressure is high than when the fuel pressure is low. This means that the rotational speed region in which resonance phenomenon occurs is higher when the fuel pressure is high than when the fuel pressure is low. Accordingly, the above-described configuration executes the range varying process.

Example 4

In the fuel injection control device of Example 2 or 3, the processing circuitry is configured to execute: a temperature acquiring process to acquire a temperature of the fuel; and a range varying process to set the predetermined range to a higher rotational speed range when the temperature is low than when the temperature is high.

The inventors discovered that the propagation speed of pressure pulsation propagating between the first fuel storage member and the second fuel storage member tends to be higher when the fuel temperature is low than when the fuel temperature is high. This means that the rotational speed region in which resonance phenomenon occurs is higher when the fuel temperature is low than when the fuel temperature is high. Accordingly, the above-described configuration executes the range varying process.

Example 5

In the fuel injection control device of any one of Examples 2 to 4, the first fuel injection valve is a first port injection valve that is configured to inject fuel into an intake passage of the internal combustion engine. The second fuel injection valve is a second port injection valve that is configured to inject fuel into the intake passage. The internal combustion engine includes a first direct injection valve, which is configured to inject fuel into a combustion chamber of the first cylinder, a first high-pressure storage member, which is connected to the first direct injection valve and configured to store fuel to be supplied to the first direct injection valve, a second direct injection valve, which is configured to inject fuel into a combustion chamber of the second cylinder, a second high-pressure storage member, which is connected to the second direct injection valve and configured to store fuel to be supplied to the second direct injection valve, and a high-pressure fuel pump, which is configured to supply the fuel under high pressure to the first high-pressure storage member such that the fuel pressure in the first high-pressure storage member becomes higher than the fuel pressure in the first fuel storage member, and supply the fuel under high pressure to the second high-pressure storage member such that the fuel pressure in the second high-pressure storage member becomes higher than the fuel pressure in the second fuel storage member. A rotational speed region in which a resonance occurs due to propagation of a pressure pulsation caused by fuel injection by the first and second port injection valves between the first and second fuel storage members is defined as a low-pressure resonance region. A rotational speed region in which a resonance occurs due to reflection of a pressure pulsation caused by operation of the high-pressure fuel pump at the first and second fuel storage members is defined as a high-pressure pump-induced resonance region. The low-pressure resonance region and the high-pressure pump-induced resonance region do not overlap with each other. The predetermined range is set in the low-pressure resonance region. The processing circuity is configured to execute the antiphase estimating process in the predetermined range. The estimating process includes a same-phase estimating process, which includes: estimating, in the high-pressure pump-induced resonance region, the fuel pressure in the first fuel storage member based on a detection value of the pressure sensor and a cycle of pulsation in the first fuel storage member, which is determined in accordance with a cycle of operation of the high-pressure fuel pump; and estimating that a phase of a periodic fluctuation of the fuel pressure in the second fuel storage member and a phase of a periodic fluctuation of the fuel pressure in the first fuel storage member are in the same phase. The injection valve operating process includes operating the first and second port injection valves such that, in the high-pressure pump-induced resonance region, when pressure in the fuel injection period that is the pressure estimated in the same-phase estimating process is high, the fuel injection period is shorter than when the pressure in the fuel injection period is low.

In the above-described configuration, the low-pressure resonance region and the high-pressure pump-induced resonance region are set not overlap with each other. This increases the accuracy of the antiphase estimating process, which is executed by assuming that, in the low-pressure resonance region, the pressure pulsation in the first fuel storage member and the pressure pulsation in the second fuel storage member are in antiphase.

In the high-pressure pump-induced resonance region, when the pressure pulsation due to operation of the high-pressure fuel pump is propagated to the first fuel storage member or the second fuel storage member and is then reflected and returned to the high-pressure fuel pump, the returned pressure pulsation and a new pressure pulsation that is generated due to operation of the high-pressure fuel pump intensify each other. Thus, in the high-pressure pump-induced resonance region, the pressure pulsation in the first fuel storage member and the pressure pulsation in the second fuel storage member are thought be in the same phase. Accordingly, in the above-described configuration, the pressure pulsation in the first fuel storage member and the pressure pulsation in the second fuel storage member are estimated be in the same phase. This makes it possible to maintain a high fuel injection accuracy of the first and second port injection valves in the high-pressure pump-induced resonance region.

Example 6

In the fuel injection control device of Example 5, the high-pressure fuel pump includes a first high-pressure fuel pump, which is configured to supply the fuel under high pressure to the first high-pressure storage member, and a second high-pressure fuel pump, which is configured to supply the fuel under high pressure to the second high-pressure storage member. Each of the first and second high-pressure fuel pumps includes a discharge metering valve, which is configured to adjust a discharge amount by permitting at least some of drawn-in fuel to be discharged back. The first and second high-pressure fuel pumps are configured such that, when one of the first and second high-pressure fuel pumps is in a stroke of drawing in fuel, the other discharges fuel.

In the above-described configuration, the high-pressure fuel pump includes a discharge metering valve, so that part of the fuel that has been drawn in is discharged back to the upstream side. In this case, pressure pulsation can occur on the upstream side of the high-pressure fuel pump due to fuel being drawing in and discharged back. In the above-described configuration, when one of the first and second high-pressure fuel pumps is in the suction stroke of drawing in fuel, the other discharged fuel. Compared to the exchange of fuel between a single high-pressure fuel pump and the upstream side thereof, the above-described configuration reduces the net amount of fuel exchanged between the first and second high-pressure fuel pumps and the upstream side thereof. This reduces the pressure pulsation that occurs on the upstream side of the first and second high-pressure fuel pumps as compared with the pressure pulsation caused by a single high-pressure fuel pump on the upstream side thereof.

Example 7

The present disclosure is embodied as a fuel injection control method that executes the various processes described in Examples 1 to 6.

Example 8

The present disclosure is embodied as a non-transitory computer readable medium that stores a program for causing a processor to execute the various processes described in Examples 1 to 6.

BRIEF DESCRIPTION OF THE DRAWINGS

FIGS. 4A to 4G are diagrams showing the mechanism of a one-third order low-pressure delivery pipe resonance in the internal combustion engine of FIG. 1;

FIGS. 5A to 5C are diagrams showing the mechanism of a first-order high-pressure pump-induced resonance in the internal combustion engine of FIG. 1;

FIGS. 6A to 6C are diagrams showing the resonance regions in the internal combustion engine of FIG. 1;

FIGS. 9A to 9D are timing diagrams showing fuel injection control of a comparison example;

DETAILED DESCRIPTION OF THE PREFERRED EMBODIMENTS

First Embodiment

A fuel injection control device for an internal combustion engine according to a first embodiment will now be described with reference to the drawings.

Figure 1:
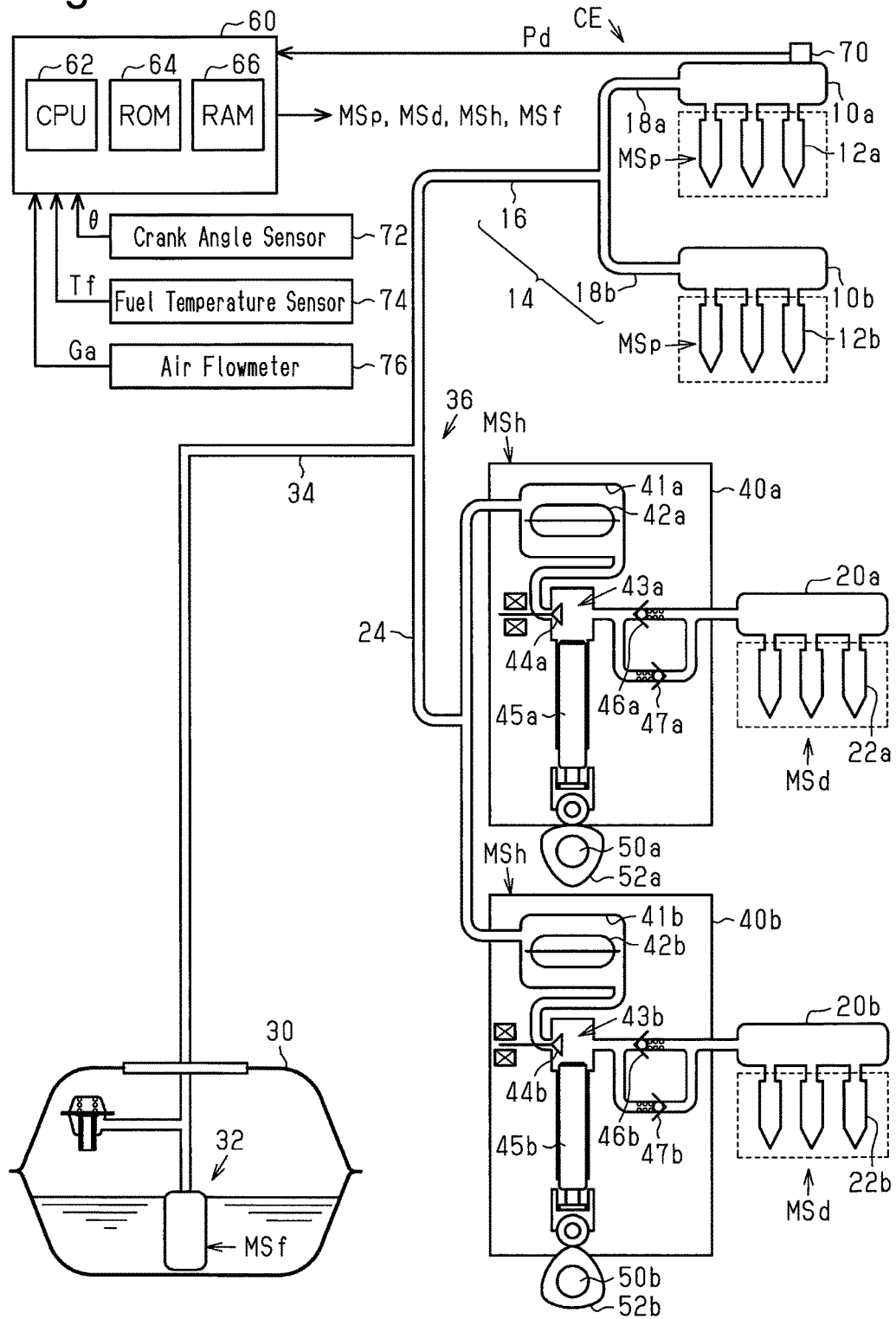
FIG. 1 is a diagram showing a fuel injection control device according to a first embodiment and an internal combustion engine.

An internal combustion engine CE shown in FIG. 1 is a V6 engine in which one combustion cycle includes four strokes. The internal combustion engine CE has fuel injection valves configured to inject fuel into the intake passage. Specifically, the internal combustion engine CE has three port injection valves 12a, which are assigned to the three cylinders of the first bank, and three port injection valves 12b, which are assigned to the remaining three cylinders, or the three cylinders of the second bank. The port injection valves 12a of the first bank inject the fuel in a low-pressure delivery pipe 10a into the intake passage, and the port injection valves 12b of the second bank injects the fuel in a low-pressure delivery pipe 10b into the intake passage. The internal combustion engine CE has fuel injection valves configured to inject fuel into the combustion chambers of the cylinders. Specifically, the internal combustion engine CE has three direct injection valves 22a, which are assigned to the three cylinders of the first bank, and three direct injection valves 22b, which are assigned to the three cylinders of the second bank. The direct injection valves 22a of the first bank inject the fuel in the high-pressure delivery pipe 20a into the combustion chambers of the cylinders of the first bank, and the direct injection valves 22b of the second bank injects the fuel in the high-pressure delivery pipe 20b into the combustion chambers of the cylinders of the second bank.

The fuel in the fuel tank 30 is supplied to the low-pressure delivery pipes 10a, 10b and the high-pressure delivery pipes 20a, 20b. That is, the fuel in the fuel tank 30 is drawn by a motor-driven feed pump 32 and discharged to a downstream-side fuel passage 34. At branch portion 36, the downstream-side fuel passage 34 branches into a port-side passage 14 and a cylinder-side passage 24. The port-side passage 14 includes a first low-pressure fuel passage 18a, which is connected to the low-pressure delivery pipe 10a, a second low-pressure fuel passage 18b, which is connected to the low-pressure delivery pipe 10b, and a merging passage 16, into which the first low-pressure fuel passage 18a and the second low-pressure fuel passage 18b merge on the upstream side.

In the present embodiment, the low-pressure delivery pipes 10a, 10b are made of metal, and the first and second low-pressure fuel passages 18a, 18b and the merging passage 16 are formed by flexible members (for example, nylon). The first and second low-pressure fuel passages 18a, 18b are formed by flexible members to allow the low-pressure delivery pipes 10a, 10b to be easily displaced relative to the fuel tank 30 by vibrations of the internal combustion engine CE. Also, except for the tolerances, the first low-pressure fuel passage 18a and the second low-pressure fuel passage 18b have the same length and cross-sectional area. Also, the low-pressure delivery pipe 10a of the first bank and the low-pressure delivery pipe 10b of the second bank have the same dimensions except for the tolerances. This is a setting for making the fuel passage on the first-bank side and the fuel passage on the second-bank side symmetrical in a section downstream of the merging passage 16 in the port-side passage 14.

The cylinder-side passage 24 is connected to a high-pressure fuel pump 40a of the first bank and a high-pressure fuel pump 40b of the second bank. The high-pressure fuel pump 40a has a combustion chamber 41a, which is connected to the cylinder-side passage 24. The combustion chamber 41a accommodates a pulsation damper 42a, which is configured to dampen pressure pulsations. The combustion chamber 41a is connected to a pressurizing chamber 43a. When an electronically controlled discharge metering valve 44a is in an open state, the combustion chamber 41a and the pressurizing chamber 43a communicate with each other. When the discharge metering valve 44a is in a closed state, the combustion chamber 41a and the pressurizing chamber 43a are shut off from each other. The volume of the pressurizing chamber 43a is repeatedly increased and reduced by displacement of a plunger 45a caused by rotation of a cam 52a connected to a camshaft 50a of the first bank.

When the discharge metering valve 44a is closed, the volume of the pressurizing chamber 43a is decreased while displacing of the plunger 45a. At this time, the fuel in the pressurizing chamber 43a is discharged to the high-pressure delivery pipe 20a via a check valve 46a. The check valve 46a opens on condition that the pressure in the pressurizing chamber 43a is higher than the pressure in the high-pressure delivery pipe 20a. The pressurizing chamber 43a and the high-pressure delivery pipe 20a are connected to each other via a check valve 47a. The check valve 47a opens on condition that the pressure in the high-pressure delivery pipe 20a is higher than the pressure in the pressurizing chamber 43a.

The configuration of the high-pressure fuel pump 40b of the second bank is the same as that of the high-pressure fuel pump 40a of the first bank. In FIG. 1, the reference numeral of each member of the high-pressure fuel pump 40b is obtained by replacing a at the end of the reference numeral of each corresponding member of the high-pressure fuel pump 40a with b. The high-pressure fuel pump 40b is driven by a cam 52b coupled to a camshaft 50b of the second bank.

In the high-pressure fuel pumps 40a, 40b, the volumes of the pressurizing chambers 43a, 43b increase and decrease three times in four strokes. In the present embodiment, the cams 52a, 52b are arranged such that the volume of the pressurizing chamber 43b is maximized when the volume of the pressurizing chamber 43a is minimized.

A control device 60 includes a central processing unit (CPU 62), a ROM 64, and RAM 66. The control device 60 is configured to control the internal combustion engine CE. In order to control the control amounts (the torque, the components of exhaust gas) of the internal combustion engine CE, the control device 60 operates various actuators such as the port injection valves 12a, 12b, the direct injection valves 22a, 22b, the high-pressure fuel pumps 40a, 40b, and feed pump 32. During such control, the control device 60 refers to the pressure Pd of the fuel in the low-pressure delivery pipe 10a of the first bank detected by a pressure sensor 70 and the rotation angle (crank angle θ) of the crankshaft detected by a crank angle sensor 72. At this time, the control device 60 also refers to the temperature (fuel temperature Tf) of the fuel in the low-pressure delivery pipe 10a detected by a fuel temperature sensor 74 and the intake air amount Ga detected by an air flowmeter 76.

Figure 2:
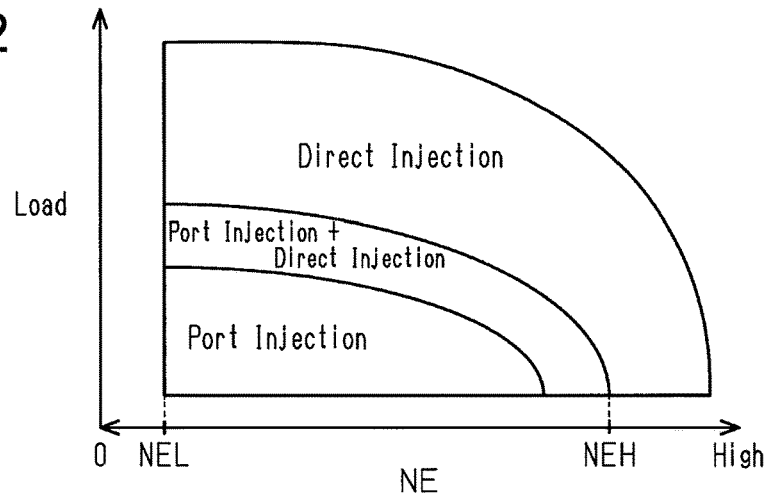
FIG. 2 is a diagram showing injection distribution between port injection valves and direct injection valves.

The control device 60 executes the fuel injection control by appropriately selecting the port injection valves 12a, 12b or the direct injection valves 22a, 22b. FIG. 2 shows the relationship between the injection valve used for the fuel injection control according to the present embodiment and the operating point determined by the rotational speed NE and the load on the internal combustion engine CE.

As shown in FIG. 2, in the present embodiment, the fuel injection control is executed using only the port injection valves 12a, 12b in a relatively low rotational speed and low load region (represented by "Port Injection" in FIG. 2). In contrast, the fuel injection control is executed using only the direct injection valves 22a, 22b in a relatively high rotational speed and high load region (represented by "Direct Injection" in FIG. 2). Then, in the region between these regions, the fuel injection control is executed using both of the port injection valves 12a, 12b and the direct injection valves 22a, 22b (represented by "Port Injection+Direct Injection" in FIG. 2). The control device 60 calculates the rotational speed NE based on the crank angle θ detected by the crank angle sensor 72 and calculates the load based on the rotational speed NE and the intake air amount Ga.

In the present embodiment, the control device 60 executes control for variably setting the injection pressure when performing the fuel injection using the port injection valves 12a, 12b. That is, the control device 60 variably sets a target value in accordance with the operating point of the internal combustion engine CE and operates the feed pump 32 to control the fuel pressure in the low-pressure delivery pipes 10a, 10b to become the target value. The low-pressure delivery pipes 10a, 10b according to the present embodiment have a so-called returnless structure. The returnless structure refers to a structure in which the low-pressure delivery pipes 10a, 10b are not provided with mechanical members for adjusting the pressure to the target value. The returnless structure does not refer to a structure without a safety valve that returns the fuel in the low-pressure delivery pipes 10a, 10b to the fuel tank 30 at a pressure higher than or equal to a specified value, which is a high pressure at which the reliability of the low-pressure delivery pipes 10a, 10b may be reduced.

When an injection amount command value Q* for the port injection valves 12a, 12b is determined based on the rotational speed NE and the load, the control device 60 controls the actual injection amount to become the injection amount command value Q* by setting the injection time shorter when the pressure in the low-pressure delivery pipe 10a, 10b is high than when the pressure in the low-pressure delivery pipes 10a, 10b is low. The control device 60 uses an average value of the pressure Pd detected by the pressure sensor 70 as the pressure in the low-pressure delivery pipes 10a, 10b except for the regions in which the pressure pulsation is conspicuous due to the resonance phenomenon.

Next, the resonance phenomenon that increases a pressure pulsation in the low-pressure delivery pipes 10a, 10b will be described. The present embodiment is targeted to a resonance phenomenon that is caused by propagation of a pressure pulsation between the low-pressure delivery pipes 10a and 10b caused by fuel injection by the port injection valves 12a, 12b (hereinafter, referred to as low-pressure delivery pipe resonance). The present embodiment is also targeted to a resonance phenomenon that is caused by operation of the high-pressure fuel pumps 40a, 40b (hereinafter, referred to as high-pressure pump-induced resonance).

Figure 3A:
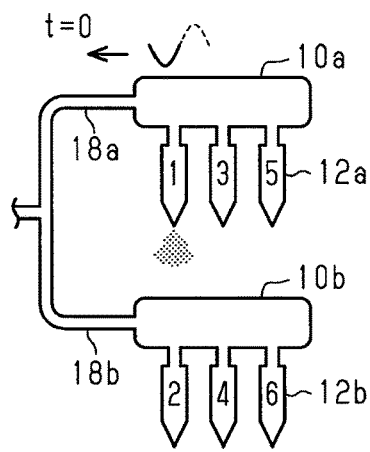
FIGS. 3A to 3C are diagrams showing the mechanism of a first-order low-pressure delivery pipe resonance in the internal combustion engine of FIG. 1.
Figure 3B:
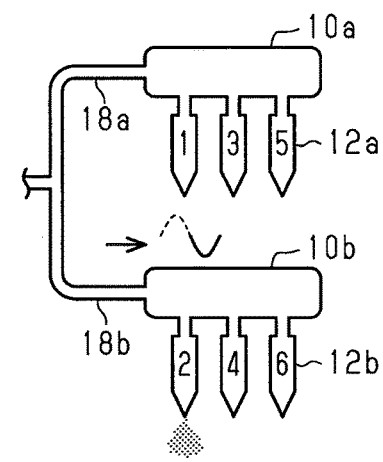
Figure 3C:
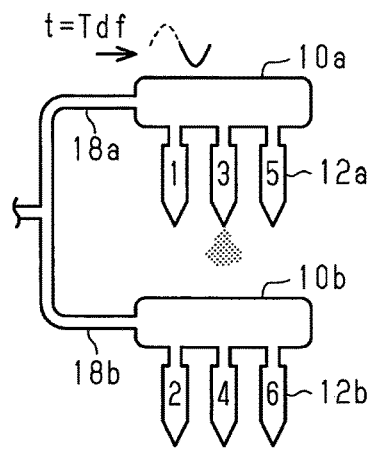

FIGS. 3A to 3C show the mechanism of the occurrence of the first-order resonance phenomenon, which is a type of the low-pressure delivery pipe resonance. In FIGS. 3A to 3C, the port injection valves 12a, 12b are numbered in the order of fuel injection. In the following description, the cylinder into which fuel is injected first is referred to as a first injection cylinder, and the cylinder into which fuel is injected second is referred to as a second injection cylinder. As shown in FIGS. 3A to 3C, in the present embodiment, fuel injection by a port injection valve 12a of the first bank is always preceded and followed by fuel injection by a port injection valve 12b of the second bank. Likewise, fuel injection by a port injection valve 12b of the second bank is always preceded and followed by fuel injection by a port injection valve 12a of the first bank.

As shown in FIG. 3A, fuel injection from the port injection valve 12a of the first injection cylinder generates a pressure pulsation in the low-pressure delivery pipe 10a of the first bank. This pressure pulsation is propagated to the low-pressure delivery pipe 10b of the second bank via the first low-pressure fuel passage 18a and the second low-pressure fuel passage 18b. As shown in FIG. 3B, in a case in which a pressure pulsation occurs in the low-pressure delivery pipe 10b by fuel injection from the port injection valve 12b of the second injection cylinder when the pressure pulsation is transmitted to the low-pressure delivery pipe 10b, the pressure pulsation caused by the fuel injection from the port injection valve 12b of the second injection cylinder and the pressure pulsation propagated from the first bank reinforce each other, resulting in resonance. Similarly, as shown in FIG. 3C, resonance occurs in a case in which a pressure pulsation occurs in the low-pressure delivery pipe 10a by fuel injection from the port injection valve 12a of the third injection cylinder when the pressure pulsation generated by the fuel injection from the port injection valve 12b of the second injection cylinder reaches the low-pressure delivery pipe 10a of the first bank. Also, as shown in FIG. 3C, resonance occurs in a case in which a pressure pulsation occurs in the low-pressure delivery pipe 10a by fuel injection from the port injection valve 12a of the third injection cylinder when the pressure pulsation caused by the fuel injection of the first injection cylinder is reflected by the low-pressure delivery pipe 10b of the second bank and then reaches the low-pressure delivery pipe 10a of the first bank.

In this manner, a first-order resonance phenomenon occurs when the pressure pulsation caused by fuel injection in one of the low-pressure delivery pipe 10a of the first bank and the low-pressure delivery pipe 10b of the second bank reciprocates once between the low-pressure delivery pipe 10a and the low-pressure delivery pipe 10b, and then the next pressure pulsation occurs due to fuel injection in the one of the low-pressure delivery pipes 10a, 10b.

The propagation path of the pressure pulsation between the port injection valve 12a of the first injection cylinder and the port injection valve 12b of the second injection cylinder can be different from the propagation path of the pressure pulsation between the port injection valve 12b of the second injection cylinder and the port injection valve 12a of the third injection cylinder. However, in the present embodiment, the variation in the lengths of the propagation paths of a pressure pulsation between a port injection valve 12a of the first bank and a port injection valve 12b of the second bank is negligible when considering the resonance phenomenon. This is because the propagation speed of the pressure in the low-pressure delivery pipes 10a, 10b is sufficiently higher than the propagation speed of the pressure in the first low-pressure fuel passage 18a and the pressure propagation speed of pressure in the second low-pressure fuel passage 18b. Therefore, the difference in length of the propagation paths due to the difference in the connection positions of the port injection valves 12a, 12b in the low-pressure delivery pipes 10a, 10b can be ignored when considering the resonance phenomenon. The reason why the propagation speed of the pressure in the low-pressure delivery pipes 10a, 10b is sufficiently higher than the propagation speed of pressure in the first low-pressure fuel passage 18a and pressure in the second low-pressure fuel passage 18b is that the stiffness of the first low-pressure fuel passage 18a and the stiffness of the second low-pressure fuel passage 18b are lower than those of the low-pressure delivery pipes 10a, 10b. That is, the propagation speed of a pressure pulsation increases as the bulk modulus increases. Thus, since the stiffness of the low-pressure delivery pipes 10a, 10b is higher than the stiffness of the first low-pressure fuel passage 18a and the stiffness of the second low-pressure fuel passage 18b, the fuel in the low-pressure delivery pipes 10a, 10b has a higher bulk modulus and a higher propagation speed of a pressure pulsation.

FIGS. 4A to 4G show the mechanism of the occurrence of a one-third order resonance phenomenon, which is a type of the low-pressure delivery pipe resonance.

As shown in FIG. 4A, fuel injection from the port injection valve 12a of the first injection cylinder generates a pressure pulsation in the low-pressure delivery pipe 10a of the first bank. This pressure pulsation is propagated to the low-pressure delivery pipe 10b of the second bank via the first low-pressure fuel passage 18a and the second low-pressure fuel passage 18b and is reflected by the low-pressure delivery pipe 10b as shown in FIG. 4B. This pressure pulsation is further propagated to the low-pressure delivery pipe 10a of the first bank via the second low-pressure fuel passage 18b and the first low-pressure fuel passage 18a and is reflected by the low-pressure delivery pipe 10a as shown in FIG. 4C. Then, as shown in FIG. 4D, a resonance phenomenon occurs in a case in which a pressure pulsation is generated in the low-pressure delivery pipe 10b by fuel injection from the port injection valve 12b of the second injection cylinder when the pressure pulsation reflected by the low-pressure delivery pipe 10a is propagated to the low-pressure delivery pipe 10b of the second bank via the first low-pressure fuel passage 18a and the second low-pressure fuel passage 18b.

Similarly, as shown in FIG. 4E, the pressure pulsation generated in the low-pressure delivery pipe 10b by fuel injection from the port injection valve 12b of the second injection cylinder and the pressure pulsation reflected by the low-pressure delivery pipe 10b are propagated to the low-pressure delivery pipe 10a of the first bank via the second low-pressure fuel passage 18b and the first low-pressure fuel passage 18a and are reflected by the low-pressure delivery pipe 10a. These pressure pulsations are propagated to the low-pressure delivery pipe 10b of the second bank via the first low-pressure fuel passage 18a and the second low-pressure fuel passage 18b and are reflected by the low-pressure delivery pipe 10b as shown in FIG. 4F. Then, as shown in FIG. 4G, a resonance phenomenon occurs in a case in which a pressure pulsation is generated in the low-pressure delivery pipe 10a by fuel injection from the port injection valve 12a of the third injection cylinder when the pressure pulsation reflected by the low-pressure delivery pipe 10b is propagated to the low-pressure delivery pipe 10a of the first bank via the second low-pressure fuel passage 18b and the first low-pressure fuel passage 18a.

In this manner, a one-third order resonance phenomenon occurs when the pressure pulsation caused by fuel injection in one of the low-pressure delivery pipe 10a of the first bank and the low-pressure delivery pipe 10b of the second bank reciprocates three times between the low-pressure delivery pipe 10a and the low-pressure delivery pipe 10b, and then the next pressure pulsation occurs due to fuel injection in the one of the low-pressure delivery pipes 10a, 10b. A one-fifth order resonance phenomenon occurs when the pressure pulsation caused by fuel injection in one of the low-pressure delivery pipe 10a of the first bank and the low-pressure delivery pipe 10b of the second bank reciprocates five times between the low-pressure delivery pipe 10a and the low-pressure delivery pipe 10b, and then the next pressure pulsation occurs due to fuel injection in the one of the low-pressure delivery pipes 10a, 10b.

Next, the mechanism of the first-order high-pressure pump-induced resonance will be described.

The high-pressure fuel pumps 40a, 40b are configured such that, during the period in which the pressurizing chambers 43a, 43b are reduced by displacement of the plungers 45a, 45b, the fuel that has been drawn into the pressurizing chambers 43a, 43b is discharged back into the cylinder-side passage 24 via the combustion chambers 41a, 41b before the discharge metering valves 44a, 44b are closed. As described above, the present embodiment is configured such that, when the volume of one of the pressurizing chamber 43a of the first bank and the pressurizing chamber 43b of the second bank is reduced, the volume of the other is increased. Thus, when fuel is discharged back to the cylinder-side passage 24 from one of the high-pressure fuel pump 40a of the first bank and the high-pressure fuel pump 40b of the second bank, the other draws in fuel from the cylinder-side passage 24. Therefore, the net amount of fuel that the high-pressure fuel pumps 40a, 40b draw in from the cylinder-side passage 24 or the net amount of fuel that the high-pressure fuel pumps 40a, 40b discharge back to the cylinder-side passage 24 is smaller than the single drawn-in amount or the discharged-back amount by one of the pressure fuel pumps 40a and 40b. However, a pressure pulsation is generated in the cylinder-side passage 24, for example, when there is a difference between the amount of fuel discharged back to the cylinder-side passage 24 from either one of the high-pressure fuel pump 40a of the first bank and the high-pressure fuel pump 40b of the second bank and the amount of fuel drawn in by the other from the cylinder-side passage 24.

The present embodiment has a configuration in which, in particular, the tolerances of the high-pressure fuel pump 40a of the first bank and the high-pressure fuel pump 40b of the second bank cause a difference between the amount of fuel drawn in by the high-pressure fuel pump 40a of the first bank from the cylinder-side passage 24 and the amount fuel drawn in by the high-pressure fuel pump 40b of the second bank. This difference generates high-pressure pump-induced resonance. Therefore, in the present embodiment, the high-pressure pump-induced resonance refers to the resonance caused by the tolerances. Even with these tolerances, the injection pressures of the direct injection valves 22a, 22b can be set to adequate values by individually controlling the discharge metering valves 44a, 44b to feedback-control the detection values of the respective pressures of the high-pressure delivery pipes 20a, 20b.

FIG. 5A illustrates a case in which a pressure pulsation has occurred in the cylinder-side passage 24 due to a difference between the discharged-back amount and the drawn-in amount. In particular, FIG. 5A illustrates a case in which a pressure pulsation occurs when one of the high-pressure fuel pumps 40a, 40b (the high-pressure fuel pump 40a) enters the suction period and the other enters the discharge period. The pressure pulsation generated in the cylinder-side passage 24 is propagated to the low-pressure delivery pipes 10a and 10b as shown in FIG. 5B. When the pressure pulsations reflected by the low-pressure delivery pipes 10a and 10b reach the high-pressure fuel pumps 40a and 40b as shown in FIG. 5C, a resonance phenomenon occurs if either one of the above has entered the next suction period and the other has entered the next discharge period. This is the first-order high-pressure pump-induced resonance. Likewise, a one-third order high-pressure pump-induced resonance and a one-fifth order high-pressure pump-induced resonance can occur.

FIGS. 6A to 6C show the rotational speed region in which the resonance phenomenon of the present embodiment occurs. Specifically, FIG. 6A shows the rotational speed region in which a low-pressure delivery pipe resonance occurs. FIG. 6B shows the rotational speed region in which a high-pressure pump-induced resonance occurs. FIG. 6C shows the rotational speed region in which a pump-to-pump resonance occurs. The pump-to-pump resonance refers to a resonance phenomenon caused when pressure pulsations generated in the low-pressure delivery pipes 10a, 10b due to fuel injection by the port injection valves 12a, 12b are reflected by the high-pressure fuel pumps 40a, 40b and are propagated to the delivery pipes 10a, 10b. For example, a first-order resonance phenomenon is caused when the pressure pulsations generated in the low-pressure delivery pipes 10a, 10b due to fuel injection by the port injection valves 12a, 12b are reflected by the high-pressure fuel pumps 40a, 40b and reach the low-pressure delivery pipes 10a, 10b, and at the same time pressure pulsations occur due to the next fuel injection by the port injection valves 12a, 12b.

As shown in FIGS. 6A to 6C, in the present embodiment, the rotational speed region in which the first-order pump-to-pump resonance occurs is lower than the lowest value of the target value of the rotational speed NE at idle, or the lowest rotational speed NEL. The rotational speed region in which a one-fifth order low-pressure delivery pipe resonance occurs and the rotational speed region in which a one-third order and one-fifth order high-pressure pump-induced resonances occur are also lower than the lowest rotational speed NEL at idle. The region from the lowest rotational speed NEL at idle to a highest rotational speed NEH, which is highest in the rotational speeds at which fuel injection is performed by the port injection valves 12a, 12b, includes the rotational speed region in which the first-order and the one-third order low-pressure delivery pipe resonances occur and the rotational speed region in which the first-order high-pressure pump-induced resonance occurs.

As shown in FIGS. 6A to 6C, the speed region from a lower end speed dd3L to an upper-end speed dd3H is a speed region in which the one-third order low-pressure delivery pipe resonance occurs. Further, the speed region from the lower end speed dd1L to the upper-end speed dd1H is a speed region in which the first-order low-pressure delivery pipe resonance occurs. Further, the speed region from a lower end speed dp1L to an upper-end speed dp1H is a speed region in which the first-order high-pressure pump-induced resonance occurs.

In the present embodiment, the rotational speed region in which the first-order high-pressure pump-induced resonance occurs does not overlap with the rotational speed region in which the first-order low-pressure delivery pipe resonance occurs or the rotational speed region in which one-third order the low-pressure delivery pipe resonance occurs. This is accomplished by setting both the time Tdf shown in FIG. 3C and the time Tdt shown in FIG. 4G not to coincide with the time Thp shown in FIG. 5C. The time Tdf is the time required for the pressure pulsation caused by the fuel injection by the port injection valves 12a, 12b to reciprocate once between the low-pressure delivery pipe 10a and the low-pressure delivery pipe 10b. The time Tdt is the time required for the pressure pulsation caused by the fuel injection by the port injection valves 12a, 12b to reciprocate three times between the low-pressure delivery pipe 10a and the low-pressure delivery pipe 10b. The time Thp is the time required for the pressure pulsation generated on the upstream side by the operation of the high-pressure fuel pumps 40a, 40b to be reflected by the low-pressure delivery pipes 10a, 10b and returned. This setting is obtained by adjusting the length and materials of the port-side passage 14 and the cylinder-side passage 24.

The control device 60 sets the valve opening time of the port injection valves 12a, 12b based on estimated values of the pressure in the low-pressure delivery pipes 10a, 10b in the rotational speed region in which the one-third order low-pressure delivery pipe resonance occurs, the rotational speed region in which the first-order low-pressure delivery pipe resonance occurs, and the rotational speed region in which the first-order high-pressure pump-induced resonance occurs.

Figure 7:
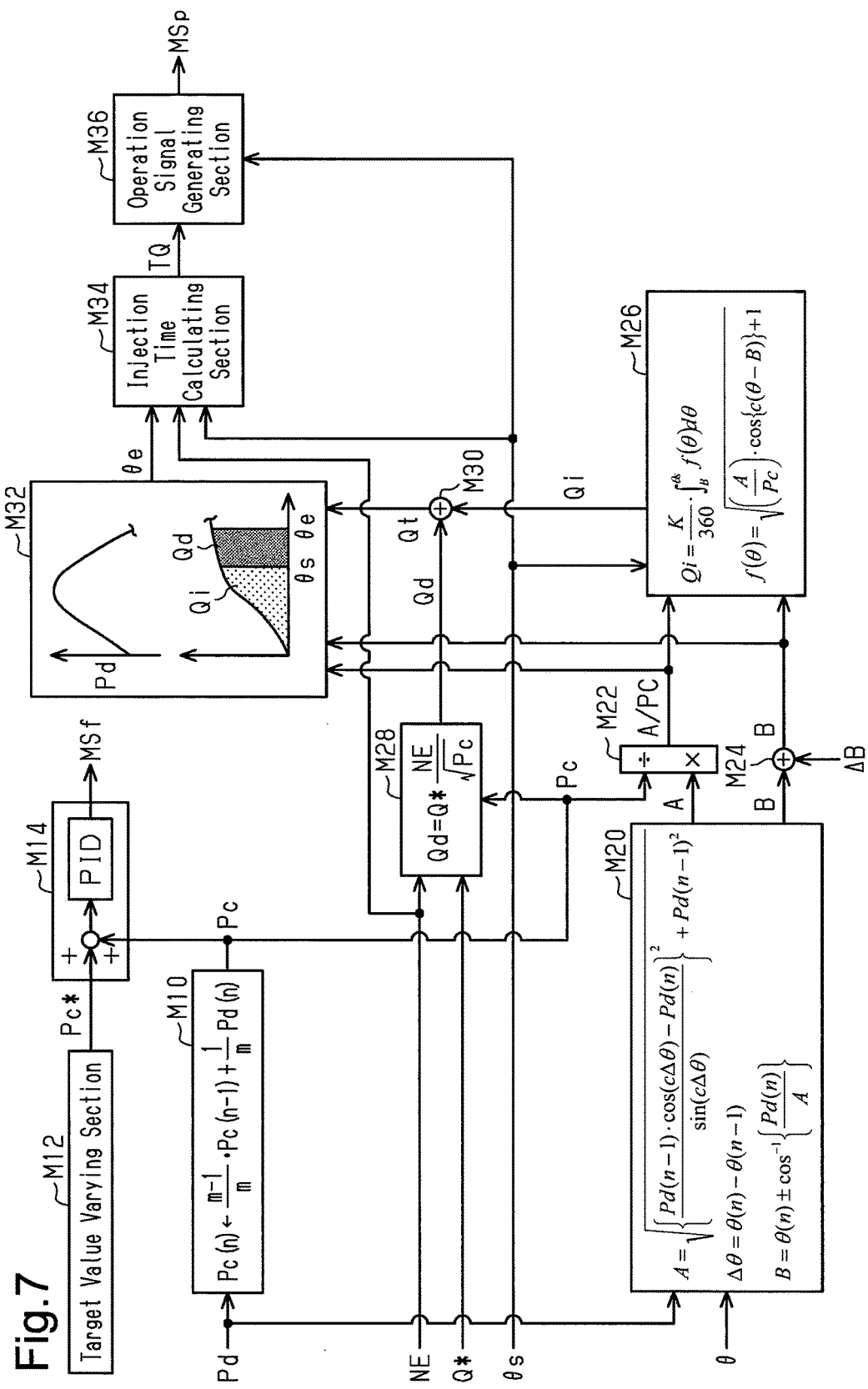
FIG. 7 is a block diagram showing an operation signal generating process executed by the fuel injection control device of FIG. 1.

FIG. 7 shows a process for generating an operation signal MSp for the port injection valves 12a, 12b in the speed region in which a resonance phenomenon occurs, together with a process for generating an operation signal MSf for the feed pump 32. The process shown in FIG. 7 is implemented by the CPU 62 executing programs stored in the ROM 64.

An average pressure calculating section M10 calculates and outputs an exponential moving average value of the pressure Pd as the average value Pc of the pressure. Specifically, the average pressure calculating section M10 multiplies the preceding average value Pc(n−1) by a weighting coefficient (m−1)/m, multiplies the current pressure Pd(n) by a weighting coefficient 1/m, and adds up the resultant values of the multiplications to obtain the current average value Pc(na). The value m is an integer that is not less than two, and is preferably greater than two. Also, the variable n represents the value of the latest sampling timing, and (n−1) represents the value of the sampling timing in the preceding control cycle.

A target value varying section M12 variably sets a target value Pc* of the pressure in the low-pressure delivery pipes 10a, 10b in accordance with the operating state of the internal combustion engine CE.

A feed pump operating section M14 calculates an operation amount for feedback-controlling the average value Pc to become equal to the target value Pc* and operates the feed pump 32 by outputting the operation signal MSf to the feed pump 32.

A parameter calculating section M20 calculates and outputs an amplitude A and a phase adjustment factor B as parameters related to an estimated value of the pressure in the low-pressure delivery pipe 10a of the first bank. The parameter calculating section M20 calculates the amplitude A and phase adjustment factor B based on the crank angle θ and the pressure Pd. In the present embodiment, it is assumed that the pressure pulsation in the low-pressure delivery pipe 10a has the shape of a sine wave, and an estimated pressure Pe is assumed to change according to the expression below.

$$Pe = A \cdot \cos\{\theta - B)\} + Pc \qquad (c1)$$

The pulsation cycle coefficient c is set to 3/2 in the rotational speed region in which the low-pressure delivery pipe resonance occurs. This setting is employed for the following reason. That is, since the angular interval at which the fuel injection is performed in the first bank is 240° CA, the pressure pulsation due to the low-pressure delivery pipe resonance has a cycle of 240° CA. Specifically, to use the cosine function as the function of the cycle of 240° CA of the crank angle θ, the pulsation cycle coefficient c is set to 360/240. Even in the rotational speed region in which the high-pressure pump-induced resonance occurs, the pulsation cycle coefficient c is set to 3/2. This setting is employed in consideration of the fact that the cycle of the pressure pulsation caused by the high-pressure fuel pump becomes a reduced cycle of either one of the pressurizing chambers 43a and 43b, so that it becomes 240° CA.

In the present embodiment, the amplitude A and the phase adjustment factor B of the expression (c1) are calculated based on adjacent crank angles θ(n−1) and θ(n) and the corresponding pressures Pd(n−1) and Pd(n).

That is, assuming that the pressure Pd(n−1) at the crank angle θ(n−1) and the pressure Pd(n) at the crank angle θ(n) satisfy the above expression (c1), the following expressions (c2) and (c3) hold true.

$$Pd(n-1) = A \cdot \cos\left[c \cdot \{\theta(n-1) - B\}\right] + Pc \qquad (c2)$$

$$Pd(n) = A \cdot \cos\left[c \cdot \{\theta(n1) - B\}\right] + Pc \qquad (c3)$$

Accordingly, the amplitude A is expressed by the following expression (c4), and the phase adjustment factor B is expressed by the following expression (c5).

$$A = \sqrt{\left\{\frac{Pd(n-1) \cdot \cos(c\Delta\theta) - Pd(n)}{\sin(c\Delta\theta)}\right\}^2 + Pd(n-1)^2} \qquad (c4)$$

$$\Delta\theta = \theta(n) - \theta(n-1)$$

$$B = \theta(n) \pm \cos^{-1}\left\{\frac{Pd(n)}{A}\right\} \qquad (c5)$$

The parameter calculating section M20 receives the crank angle θ(n−1), the pressure Pd (n−1), the crank angle θ(n), and the pressure Pd (n) and calculates the amplitude A based on the above expression (c4). Further, the parameter calculating section M20 obtains two or more values of the phase adjustment factor B using the above expression (c5) and substitutes the values into the above expression (c1). The parameter calculating section M10 determines that the correct value is the value with which smaller values of the differences between the estimated pressures Pe (n−1), Pe(n) and the actual pressures Pd (n−1), Pd(n) are obtained at each of the crank angles θ(n−1), θ(n).

A normalizing section M22 calculates and outputs a value A/Pc, which is obtained by dividing the amplitude A by the average value Pc. A correcting section M24 corrects, for the second bank, the phase adjustment factor B of the low-pressure delivery pipe 10b with a correction amount AB.

The correction amount ΔB for the phase adjustment factor B of the low-pressure delivery pipe 10a of the first bank is zero.

A hypothetical injection amount calculating section M26 receives injection starting point in time θs, which is set according to the operating state of the internal combustion engine CE, A/Pc, and the phase adjustment factor B output by the correcting section M 24. The hypothetical injection amount calculating section M26 calculates a hypothetical injection amount Qi, which is obtained by multiplying, by a predetermined number, the injection amount in a case in which it is assumed that the port injection valves 12a, 12b are opened over the period from a reference rotation angle to the injection starting point in time θs. The reference rotation angle is set to the value of the phase adjustment factor B. The predetermined number is a value obtained by dividing the rotational speed NE (rpm) by the square root of the average value Pc. The hypothetical injection amount Qi is calculated based on the presence of a pressure pulsation of the amplitude A, the phase adjustment factor B, and the pulsation cycle coefficient c in each of the low-pressure delivery pipes 10a, 10b.

Specifically, it is assumed that the amount of fuel injected from the port injection valves 12a, 12b is proportional to the injection time and the square root of the fuel pressure P in the low-pressure delivery pipes 10a, 10b. That is, if the pressure P is constant, the injection amount Q is expressed by the following equation (c6) using the injection time i (ms).

$$Q = K \cdot \{\tau/(60 \cdot 1000)\} \cdot \sqrt{(P)} \tag{c6}$$

The value K/(60·1000) is a proportionality constant. In the following description, the value $\{K/(60 \cdot 1000)\} \cdot \sqrt{(P)}$, which is a value obtained by multiplying the proportionality constant by ρ (P) will be referred to as an injection coefficient. In the above equation (c6), when the pressure P fluctuates as in the expression $A\cos\{c \cdot (\theta - B)\} + Pc$ in accordance with the crank angle θ, the hypothetical injection amount Qi is expressed by the following expression (c7).

$$\begin{aligned} Qi &= \frac{NE}{\sqrt{Pc}} \cdot \frac{K}{60 \cdot 1000} \cdot \int_B^{\theta s} \frac{1}{360 \cdot NE/60 \cdot 1000} \sqrt{P}\, d\theta \\ &= \frac{K}{360 \cdot \sqrt{Pc}} \cdot \int_B^{\theta s} \sqrt{A\cos\{c(\theta - B)\} + Pc}\, d\theta \\ &= \frac{K}{360} \cdot \int_B^{\theta s} f(\theta) d\theta \end{aligned} \tag{c7}$$

$$f(\theta) = \sqrt{\left(\frac{A}{Pc}\right) \cdot \cos\{c(\theta - B)\} + 1}$$

Since the integrand f (θ) in the above expression (c7) is determined by A/Pc and (θ−B) and the definite integral is an integrated value from B to θs, the value of the definite integral from the rotation angle (B), which is the reference of the integrand f (θ), to the injection starting time θs can be calculated based on A/Pc and (θs−B). In the present embodiment, a two-dimensional map defining the relationship of A/Pc and (θs−B) with the value of the definite integral is stored in the ROM 64 in advance, and the value of the definite integral is calculated based on the two-dimensional map.

A required dimension correcting section M28 multiplies the injection amount command value Q*, which is set in accordance with the operating state of the internal combustion engine CE, by the value obtained by dividing the rotational speed NE by the square root of the average value Pc, thereby converting the injection amount command value Q* into the dimension of the hypothetical injection amount Qi. The required dimension correcting section M28 uses the resultant value as a hypothetical required injection amount Qd.

An adding section M30 adds the hypothetical required injection amount Qd to the hypothetical injection amount Qi to calculate a hypothetical total injection amount Qt.

An injection end point-in-time calculating section M32 receives the hypothetical total injection amount Qt, A/Pc, and the phase adjustment factor B to calculate injection end point in time θe. The injection end time calculating section M32 executes a process of searching for the injection end point in time θe at which the hypothetical total injection amount Qt is equal to the value obtained by multiplying, by the predetermined number (NE/√Pc), the injection amount on the assumption that the port injection valves 12a, 12b are opened over the period from the reference rotation angle to the injection end point in time θe. Specifically, the injection end point in time θe is temporarily set to various values using the two-dimensional map defining the relationship of A/Pc and (θs−B) with the definite integral, which is used by the hypothetical injection amount calculating section M26. The value of the injection end point in time θe with which the calculated injection amount is equal to the hypothetical total injection amount Qt is defined as the final injection end point in time θe.

An injection time calculating section M34 calculates injection time TQ, for which the port injection valves 12a, 12b are opened, based on the injection starting point in time θs, the injection end point in time θe, and the rotational speed NE. The operation signal generating section M36 calculates and outputs the operation signal MSp for the port injection valves 12a, 12b based on the injection time TQ and the injection starting point in time θs.

Figure 8:
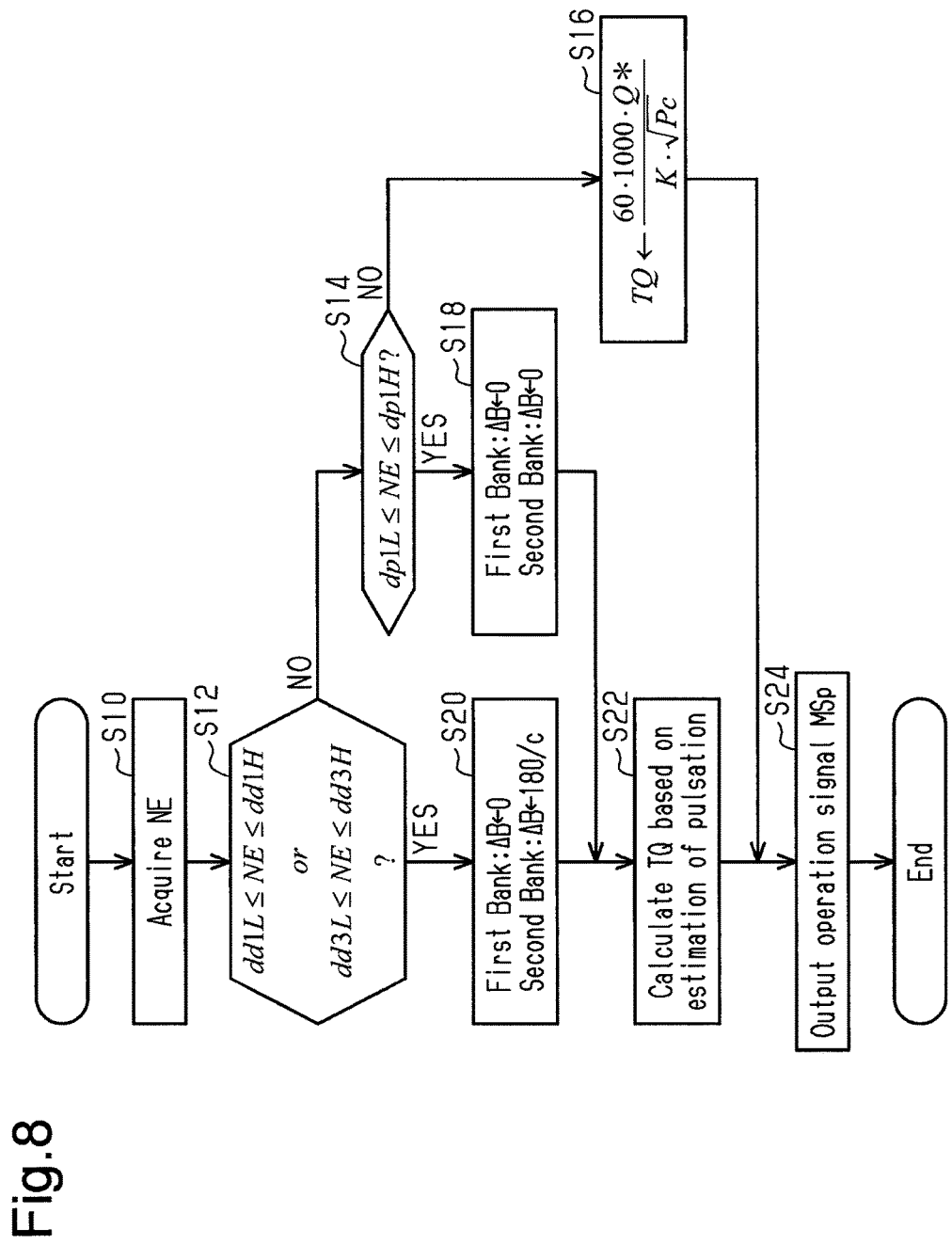
FIG. 8 is a flowchart showing a procedure of a process for generating the operation signal of the port injection valves according to the first embodiment.

FIG. 8 shows the procedure for generating the operation signal MSp for the port injection valve 12a, 12b according to the present embodiment. The process shown in FIG. 8 is performed by the CPU 62 repeatedly executing programs stored in the ROM 64 at a predetermined interval. In the following description, the number of each step is represented by the letter S followed by a numeral.

In the series of processes shown in FIG. 8, the CPU 62 first acquires the engine speed NE (S10). Then, the CPU 62 determines whether the logical disjunction is true of the rotational speed NE being in the rotational speed region in which the first-order low-pressure delivery pipe resonance occurs and the engine speed NE being in the rotational speed region in which the one-third order low-pressure delivery pipe resonance occurs (S12). When determining that the logical disjunction is false (S12: NO), the CPU 62 determines whether the rotational speed NE is in the rotational speed region in which the first-order high-pressure pump-induced resonance occurs (S14). When determining that the rotational speed NE is not in the rotational speed region in which the first-order high-pressure pump-induced resonance occurs (S14: NO), the CPU 62 calculates the injection time TQ by receiving the average value Pc and the injection amount command value Q* and assuming that the pressure in the low-pressure delivery pipes 10a, 10b in the above expression (c6) is fixed to the average value Pc.

In contrast, when determining that the rotational speed NE is in the rotational speed region in which the first-order high-pressure pump-induced resonance occurs (S14: YES), the CPU 62 sets the correction amount ΔB to zero for both of the port injection valve 12a of the first bank and the port injection valve 12b of the second bank (S18). This setting is employed on the assumption that the phase of the pressure pulsation in the low-pressure delivery pipe 10a of the first bank and the phase of the pressure pulsation in the low-pressure delivery pipe 10b of the second bank are in the same phase. The pressure pulsations occurring on the upstream sides of the high-pressure fuel pumps 40a, 40b due to the operation thereof are symmetrical. Due to the symmetry, these pressure pulsations are thought to simultaneously reach the low-pressure delivery pipe 10a in the first bank and the low-pressure delivery pipe 10b in the second bank. This is inferred to be the reason why the pressure pulsations are in the same phase.

On the other hand, when determining that the rotational speed NE is in the rotational speed region in which the first-order or one-third order low-pressure delivery pipe resonance occurs (S12: YES), the CPU 62 sets the correction amount AB to zero for the port injection valve 12a of the first bank, while setting the correction amount ΔB to 180/c for the port injection valve 12b of the second bank (S20). This setting is employed based on the result of an experiment in which it was found out that the phase of the pressure pulsation in the low-pressure delivery pipe 10a of the first bank and the phase of the pressure pulsation in the low-pressure delivery pipe 10b of the second bank are in antiphase. The reason for the antiphase is inferred to be that, in FIGS. 3A to 3C, fuel is injected from the port injection valve 12b of the second injection cylinder when half cycle of the pressure pulsation caused by the fuel injection from the port injection valve 12a of the first injection cylinder has elapsed from the time of the fuel injection from the port injection valve 12a of the first injection cylinder.

When the processes of S18 and S20 are completed, the CPU 62 calculates the injection time TQ by the process shown in FIG. 7 (S22). Then, when the processes of S16 and S22 are completed, the CPU 62 calculates the operation signal MSp based on the injection time TQ (S24). This process is executed by the operation signal generating section M36 shown in FIG. 7. That is, even in the case of calculating the injection time TQ by the process of S16, the operation signal generating section M36 is used for the process for generating the operation signal MSp based on the injection time TQ.

When the process of step S24 is completed, the CPU 62 temporarily ends the series of processes shown in FIG. 8.

The operation of the present embodiment will now be described.

As a comparative example of the present embodiment, FIGS. 9A to 9D illustrate a case in which it is assumed that the injection time TQ is calculated by the process of S16 of FIG. 8 when the low-pressure delivery pipe resonance is occurring. Specifically, FIG. 9A shows movements of the pressure Pd detected by the pressure sensor 70, along with movements of the actual pressure P1 in the low-pressure delivery pipe 10a and the actual pressure P2 in the low-pressure delivery pipe 10b. FIG. 9B shows movements of the average value Pc. FIG. 9C shows movements of the value of the injection coefficient (60·1000)/{K·(√Pc)}, and FIG. 9D shows the injection time TQ, which is calculated by the process of S16 in FIG. 8. In each of FIGS. 9A to 9D, the left side shows data on the first bank and the right side shows data on the second bank.

In the example shown in FIGS. 9A to 9D, since the pressure in the low-pressure delivery pipe 10a of the first bank is higher than the average value Pc during the injection period indicated by the injection time TQ, the injection time TQ is longer than necessary and the actual air-fuel ratio shifts to the rich side with respect to the target air-fuel ratio in the first bank. On the other hand, since the pressure in the low-pressure delivery pipe 10b of the second bank is lower than the average value Pc during the injection period indicated by the injection time TQ, the injection time TQ is shorter than the required value and the actual air-fuel ratio shifts to the lean side with respect to the target air-fuel ratio in the second bank.

In contrast, in the present embodiment, when the rotational speed NE is in the rotational speed region in which the low-pressure delivery pipe resonance occurs, the CPU 62 determines, based on the pressure Pd, that the cycle of the pressure pulsation in the low-pressure delivery pipe 10a becomes equal to the fuel injection cycle in the first bank and assumes that the pressure pulsation has the shape of a sine wave. The CPU 62 thus estimates the pressure in the low-pressure delivery pipe 10a. In addition, the CPU 62 estimates the pressure in the low-pressure delivery pipe 10b by assuming that the pressure in the low-pressure delivery pipe 10b has a pulsation of an antiphase with respect to the pulsation of the pressure in the low-pressure delivery pipe 10a. Then, the CPU 62 operates the port injection valves 12a, 12b based on the pressure pulsations. This makes it possible to maintain a high fuel injection accuracy even when a low-pressure delivery pipe resonance is occurring.

The present embodiment described above further achieves the following advantages.

(1) The rotational speed region in which the first-order high-pressure pump-induced resonance occurs does not overlap with the rotational speed region in which the first-order low-pressure delivery pipe resonance occurs or the rotational speed region in which one-third order the low-pressure delivery pipe resonance occurs. Thus, when a low-pressure delivery pipe resonance is occurring, the above-described embodiment improves the accuracy of the estimating process, in which it is assumed that the pulsation of the pressure in the low-pressure delivery pipe 10a and the pulsation of the pressure in the low-pressure delivery pipe 10b are in antiphase.

(2) In the range of the rotational speed where the first-order high-pressure pump-induced resonance occurs, the estimating process is executed in which it is assumed that the pulsation of the pressure in the low-pressure delivery pipe 10a and the pulsation of the pressure in the low-pressure delivery pipe 10b are in antiphase. It is thus possible to maintain a high fuel injection accuracy of the port injection valves 12a, 12b in the speed region in which a high-pressure pump-induced resonance occurs.

(3) In the process in which one of the high-pressure fuel pumps 40a, 40b is in the fuel discharge stroke when the other is in the fuel suction stroke. This reduces the pressure pulsations occurring on the upstream side of both high-pressure fuel pumps 40a, 40b, rather than a pressure pulsation separately generated on the upstream side by each of the high-pressure fuel pumps 40a, 40b.

(4) The port injection valves 12a, 12b are operated based on the estimation of the pressure pulsations only in the rotational speed region in which resonance occurs. In the present embodiment, a pulsation having a single cycle that can be acquired in advance is dominant among pressure pulsations in the low-pressure delivery pipes 10a, 10b in the rotational speed region in which resonance occurs. Therefore, in the rotational speed region in which resonance occurs, the influence of a pressure pulsation due to other factors such as a pressure pulsation caused by the feed pump 32 is relatively small as compared with a pulsation having a single cycle that can be acquired in advance. A high soundto-noise ratio thus can be maintained in the case in which factors other than a pulsation having a single cycle that can be acquired in advance are regarded as noise.

Second Embodiment

A second embodiment will now be described with reference to the drawings. The differences from the first embodiment will mainly be discussed.

In the present embodiment, the rotational speed region of the low-pressure delivery pipe resonance and the high-pressure pump-induced resonance is variably set in accordance with the pressures in the low-pressure delivery pipes 10a, 10b. This configuration is employed in consideration of the fact that the speed at which a pressure pulsation propagates between the low-pressure delivery pipe 10a and the low-pressure delivery pipe 10b is higher when the pressure is high than when the pressure is low.

Figure 10:
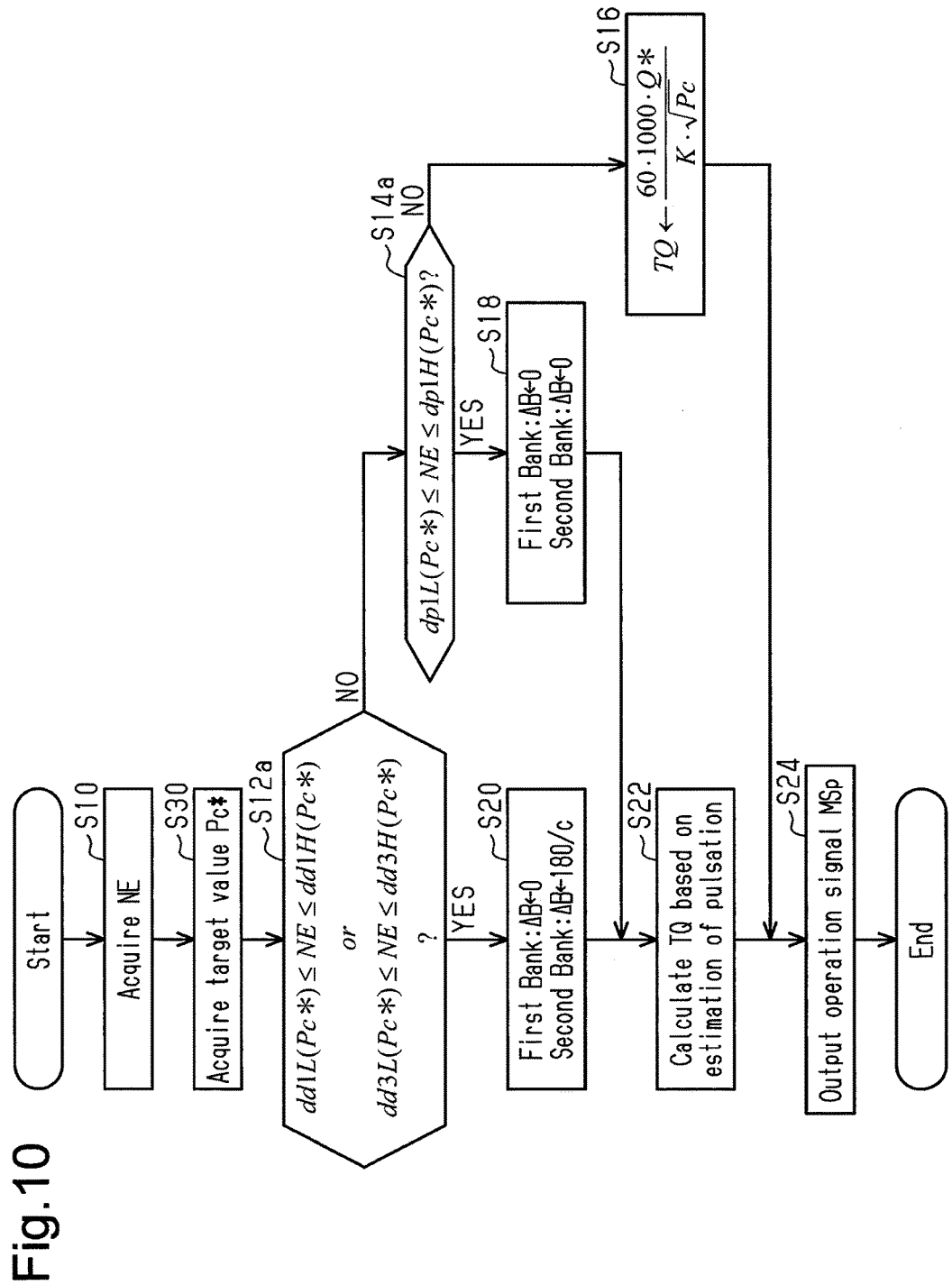
FIG. 10 is a flowchart showing a procedure of a process for generating the operation signal of the port injection valves according to a second embodiment.

FIG. 10 shows the procedure for generating the operation signal MSp for the port injection valve 12a, 12b according to the present embodiment. The process shown in FIG. 10 is performed by the CPU 62 repeatedly executing programs stored in the ROM 64 at a predetermined interval. In FIG. 10, the process corresponding to the process shown in FIG. 8 is given the same step number for the illustrative purposes and the explanation is omitted.

In the series of processes shown in FIG. 10, when the process of S10 is completed, the CPU 62 acquires the target value Pc* of the pressures in the low-pressure delivery pipes 10a, 10b (S30). Then, in the process of S12a, which replaces the process of S12, the CPU 62 sets the lower end speed dd1L and the upper-end speed dd1H, which are related to the first-order low-pressure delivery pipe resonance and the lower end speed dd3L, and the upper upper-end speed dd3H related to the one-third low-pressure delivery pipe resonance to higher values when the target value Pc* is high than when the target value Pc* is low. Then, as the determination process of S12a, the CPU 62 determines whether the logical disjunction is true of the rotational speed NE being in the region between the lower end speed dd1L and the upper-end speed dd1H and the engine speed NE being in the region between the lower end speed dd3L and the upper-end speed dd3H.

In addition, in the process of S14a, which replaces the process of S14, the CPU 62 sets the lower end speed dp1L and the upper-end speed dp1H of the first-order high-pressure pump-induced resonance to higher values when the target value Pc* is high than when the target value Pc* is low. Then, as the determination process of S14a, the CPU 62 determines whether the rotational speed NE is in the region between the lower end speed dp1L and the upper-end speed dp1H.

Third Embodiment

A third embodiment will now be described with reference to the drawings. The differences from the first embodiment will mainly be discussed.

In the present embodiment, the rotational speed region of the low-pressure delivery pipe resonance and the high-pressure pump-induced resonance is variably set in accordance with the fuel temperature Tf in the low-pressure delivery pipes 10a, 10b. This configuration is employed in consideration of the fact that the speed at which a pressure pulsation propagates between the low-pressure delivery pipe 10a and the low-pressure delivery pipe 10b is higher when the fuel temperature Tf is low than when it is high.

Figure 11:
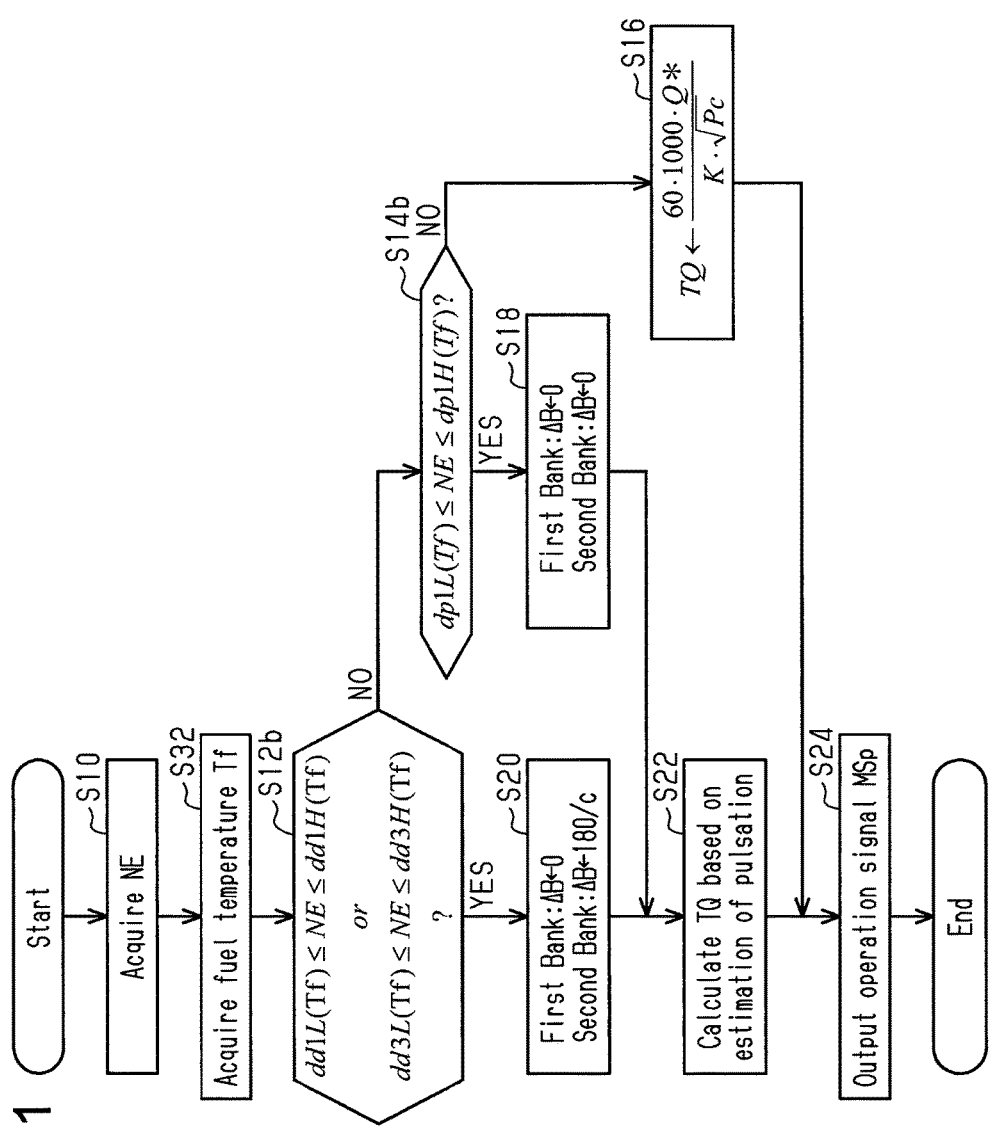
FIG. 11 is a flowchart showing a procedure of a process for generating the operation signal of the port injection valves according to a third embodiment.

FIG. 11 shows the procedure for generating the operation signal MSp for the port injection valve 12a, 12b according to the present embodiment. The process shown in FIG. 11 is performed by the CPU 62 repeatedly executing programs stored in the ROM 64 at a predetermined interval. In FIG. 11, the process corresponding to the process shown in FIG. 8 is given the same step number for the illustrative purposes and the explanation is omitted.

In the series of processes shown in FIG. 11, when the process of S10 is completed, the CPU 62 acquires the fuel temperature Tf in the low-pressure delivery pipes 10a, 10b (S32). Then, in the process of S12b, which replaces the process of S12, the CPU 62 sets the lower end speed dd1L and the upper-end speed dd1H, which are related to the first-order low-pressure delivery pipe resonance and the lower end speed dd3L, and the upper upper-end speed dd3H related to the one-third low-pressure delivery pipe resonance to higher values when the fuel temperature Tf is low than when the fuel temperature Tf is high. Then, as the determination process of S12b, the CPU 62 determines whether the logical disjunction is true of the rotational speed NE being in the region between the lower end speed dd1L and the upper-end speed dd1H and the engine speed NE being in the region between the lower end speed dd3L and the upper-end speed dp3H.

In addition, in the process of S14b, which replaces the process of S14, the CPU 62 sets the lower end speed dp1L and the upper-end speed dp1H of the first-order high-pressure pump-induced resonance to higher values when the fuel temperature Tf is low than when the fuel temperature Tf is high. Then, as the determination process of S14b, the CPU 62 determines whether the rotational speed NE is in the region between the lower end speed dp1L and the upper-end speed dp1H.

<Correspondence>

The correspondence between the items in the above embodiments and the items described in the above SUMMARY is as follows. Below, the correspondence is shown for each of the numbers in the examples described in the above SUMMARY.

[1] The "first fuel storage member" corresponds to the low-pressure delivery pipe 10a. The "second fuel storage member" corresponds to the low-pressure delivery pipe 10b. The "estimating process" corresponds to the process by the parameter calculating section M20 and the process of S20. The "injection valve operating process" corresponds to the processes of the normalizing section M22, the hypothetical injection amount calculating section M26, the required dimension correcting section M28, the adding section M30, the injection end time calculating section M32, the injection time calculating section M34, and the operation signal generating section M36. The "first cylinder" corresponds to the first injection cylinder, the third injection cylinder, and the fifth injection cylinder in FIGS. 3A to 3C. The "second cylinder" corresponds to the second injection cylinder, the fourth injection cylinder, and the sixth injection cylinder in FIGS. 3A to 3C.

[2] The "speed acquiring process" corresponds to the process of S10.

[3] The "target value varying process" corresponds to the process by the target value varying section M12. The "pump operating process" corresponds to the process by the feed pump operating section M14. The "range varying process" corresponds to the process of S12a.

[4] The "temperature acquiring process" corresponds to the process of S32. The "range varying process" corresponds to the process of S12b.

[5] The "first high-pressure storage member" corresponds to the high-pressure delivery pipe 20a. The "second high-pressure storage member" corresponds to the high-pressure delivery pipe 20b. The "high-pressure fuel pump" corresponds to the high-pressure fuel pump 40a and the high-pressure fuel pump 40b. Also, the "low-pressure resonance region" corresponds to the region shown in FIG. 6A. The "high-pressure pump-induced resonance region" corresponds to the region shown in FIG. 6B. The "estimating process" includes the process of S18 in addition to the process by the parameter calculating section M20 and the process of S20. The "cycle of operation of the high-pressure fuel pump" corresponds to 240° CA, which is the cycle of the suction stroke of the high-pressure fuel pump 40a or the high-pressure fuel pump 40b.

[6] The "first high-pressure fuel pump" corresponds to the high-pressure fuel pump 40a, and the "second high-pressure fuel pump" corresponds to the high-pressure fuel pump 40b.

Other Embodiments

At least one feature of the above-illustrated embodiments may be modified as follows.

Regarding High-Pressure Pump-Induced Resonance

The above-illustrated embodiments are configured such that the first-order high-pressure pump-induced resonance occurs in the region from the lowest rotational speed NEL to the highest rotational speed NEH. However, it may be configured such that the first-order high-pressure pump-induced resonance occurs in the region lower than the lowest rotational speed NEL.

The above-illustrated embodiments are configured such that the one-third order high-pressure pump-induced resonance occurs in the region lower than the lowest rotational speed NEL. However, the above-illustrated embodiments may be configured such that the one-third order high-pressure pump-induced resonance occurs in the region higher than the highest rotational speed NEH. Nevertheless, the one-third order high-pressure pump-induced resonance may be caused to occur in the region from the lowest rotational speed NEL to the highest rotational speed NEH. Even in this case, as long as the rotational speed region in which the one-third order high-pressure pump-induced resonance occurs does not overlap with the rotational speed region in which low-pressure delivery pipe resonance occurs, an accurate estimation is possible by assuming that, when the low-pressure delivery pipe resonance occurs, the pulsation of the pressure in the low-pressure delivery pipe 10b and the pulsation of the pressure in the low-pressure delivery pipe 10a are in antiphase.

Even when the rotational speed region in which the high-pressure pump-induced resonance occurs and the rotational speed region in which the low-pressure delivery pipe resonance occurs overlap with each other, there is a condition in which it is possible to make an accurate estimation on the assumption that the pulsation of the pressure in the low-pressure delivery pipe 10b and the pulsation of the pressure in the low-pressure delivery pipe 10a are in antiphase. This is the case, for example, in which the energy of the pressure pulsation by the high-pressure pump-induced resonance is sufficiently small compared to the energy of the pressure pulsation by the low-pressure delivery pipe resonance.

The high-pressure pump-induced resonance is not limited to those caused by the tolerances of the high-pressure fuel pumps 40a, 40b. For example, the high-pressure pump-induced resonance may be caused when the discharged-back fuel amount of one of the high-pressure fuel pump 40a and the high-pressure fuel pump 40b that is on the discharge stroke side is less than the suction fuel amount of the other one of the pumps 40a, 40b, which is on the suction stroke. In this case, the cycle of the operation of the high-pressure fuel pumps 40a, 40b, which defines the cycle of the pressure pulsation, is 120° CA in the configuration of the above-illustrated embodiments.

Regarding High-Pressure Fuel Pump

For example, the high-pressure pump-induced resonance may be made negligible by strengthening the functions of the pulsation dampers 42a, 42b.

The discharge cycles of the high-pressure fuel pumps 40a, 40b do not necessarily need to match with the fuel injection cycles of the respective banks. For example, the cam 52a may be set such that the discharge stroke of the high-pressure fuel pump 40a occurs once each time the fuel injection is performed twice in the first bank, and the cam 52b may be set such that the discharge stroke of the high-pressure fuel pump 40b occurs once each time the fuel injection is performed twice in the second bank. In this case, when the suction stroke of one of the high-pressure fuel pump 40a and the high-pressure fuel pump 40b is set to coincide with the discharge stroke of the other as in the above embodiment, the cycle of the high-pressure pump-induced resonance caused by the tolerances is 480° CA.

It is not indispensable to set the volume of the pressurizing chamber 43b of the high-pressure fuel pump 40b to be maximized when the volume of the pressurizing chamber 43a of the high-pressure fuel pump 40a is minimized. For example, the volume of the pressurizing chamber 43b of the high-pressure fuel pump 40b may be minimized when the volume of the pressurizing chamber 43a of the high-pressure fuel pump 40a is the minimized.

The high-pressure delivery pipe 20a and the high-pressure delivery pipe 20b do not necessarily need to be provided with the different high-pressure fuel pumps 40a, 40b, but may be provided with a single high-pressure fuel pump. Even in this case, a high-pressure pump-induced resonance can occur similarly to the above embodiments. Also, in this case, the high-pressure delivery pipe 20a and the high-pressure delivery pipe 20b communicate with each other in the same manner as the low-pressure delivery pipe 10a and the low-pressure delivery pipe 10b. Therefore, the direct injection valves 22a, 22b may cause a resonance phenomenon due to propagation of pressure pulsation between the high-pressure delivery pipe 20a and the low-pressure delivery pipe 10b. In this case, measures similar to that for the low-pressure delivery pipe resonance in the above embodiments may be taken.

Regarding Estimating Process

In the above-illustrated embodiments, the estimated pressure Pe is considered to be changing over time to have the shape of a sine wave. For example, the temporal change of pressure in a period in which the pressure gradually increases periodically and the temporal change of pressure in a period in which the pressure gradually decreases may be regarded as being proportional to the crank angle θ. This modification can be achieved by the above described the pulsation cycle coefficient c in the following manner. That is, the estimated pressure Pe is expressed by $(A \cdot \{\theta - (x/c)\} - (90 \cdot A/c) + Pc)$ when the crank angle θ is in the range from $x/c°$ CA to $(180+x)/c°$ CA and the expression $(-A \cdot \{-(x/c)\} + (270 \cdot A/c) + Pc)$ when the crank angle θ is in the range from $(180+x)/c°$ CA to $(360+x)/c°$ CA. This modification includes two parameters "A" and "x." Thus, when $P(n-1) < P(n)$, the crank angle θ is regarded as being in the region from $x/c°$ CA to (180+x)/c° CA. Thus, by using two sets of the crank angle θ and the corresponding pressure Pd, the values of the parameters can be determined. In this modification, the crank angle θ is not limited to be in the range from to 0° CA to 360° CA, but monotonically changes before and after the value of the crank angle θ that determines the values of the above parameters, so that the crank angle θ can be a value in the range from x/c° CA to x/c+360° CA. In this case, when the value of the crank angle θ that has determined the values of the above parameters is too close to (360+x)/c° CA, the same pressure change is assumed to take place in the range from (360+x)/c° CA to (540+x)/c° CA as in the range from x/c° CA to (180+x)/c° CA.

Regarding Injection Valve Operating Process

The hypothetical injection amount calculating section M26 does not necessarily need to execute the process using the map the output of which is the definite integral of the expression (c7) above. For example, the expression (c7) may be calculated without using a map.

The injection end point-in-time calculating section M32 does not necessarily need to execute the process using the map the output of which is the definite integral of the expression (c7) above. For example, the expression (c7) may be calculated without using a map.

The process of calculating the hypothetical injection amount Qi is not indispensable. For example, the range of the definite integral in the expression (c7) above may be set as the range from the injection starting point in time θs to a predetermined point in time θx, and the predetermined point in time θx at which the definite integral becomes the hypothetical required injection amount Qd may be searched for as the injection end time point in time θe.

The process of generating the operation signal MSp for the port injection valves 12a, 12b is not limited to that in the above-illustrated embodiments. For example, based on the average value of the estimated pressure Pe at each of the points in time obtained by equally dividing a predetermined period from the injection starting point in time θs by n (n>1), the injection time TQ may be calculated by the same processing as in the process of S16, and the operation signal MSp may be generated based on the calculated injection time TQ. For example, the predetermined period may be longer when the injection amount command value Q* is large than when it is small. Also, for example, the predetermined period may be longer when the target value Pc* is low than when it is high.

Regarding Temperature Acquiring Process

The fuel temperature Tf detected by the fuel temperature sensor 74 does not necessarily need to be used. For example, an estimated value may be used. The estimated value can be calculated based on, for example, the coolant temperature of the internal combustion engine CE and the detection value of the intake air temperature. Since the coolant serves as a heat source that gives heat to the fuel, the CPU 62 preferably calculates the temperature of the fuel to be a higher value when the coolant temperature is high than when it is low. In addition, since the heat radiation target to which the fuel radiates heat is the air around the low-pressure delivery pipes 10a, 10b, the CPU 62 preferably calculates the fuel temperature to be a lower value than when the intake air temperature is high.

Regarding Range Varying Process

In FIG. 10, the rotational speed region in which the process for determining the injection time TQ based on the estimation of the pressure pulsation is variably set based on the target value Pc*. However, this rotational speed range may be set in a different manner. For example, it may be variably set based on the average value Pc.

The range varying process is not limited to those illustrated in FIGS. 10 and 11. For example, the range varying process may be executed in accordance with both of the fuel temperature Tf and the pressure.

Regarding Predetermined Range

The rotational speed NE being in a predetermined range narrower than the region from the lowest rotational speed NEL to the highest rotational speed NEH does not necessarily need to be the condition for operating the port injection valves 12a, 12b based on the estimating process, in which it is assumed that a pressure pulsation in the low-pressure delivery pipe 10b and the pressure pulsation in the low-pressure delivery pipe 10a are in antiphase. For example, in a configuration not provided with the high-pressure fuel pumps 40a, 40b or the direct injection valves 22a, 22b, even when resonance is not occurring, a minute pressure pulsation of fuel may be estimated by assuming that the pressure pulsation in the low-pressure delivery pipe 10b and the pressure pulsation of the low-pressure delivery pipe 10a are in antiphase. However, the high-pressure fuel pumps 40a, 40b or the direct injection valves 22a, 22b do not necessarily need to be omitted. That is, for example, if a remarkable resonance phenomenon other than the low-pressure delivery pipe resonance does not occur in the region from the lowest rotational speed NEL to the highest rotational speed NEH, the port injection valves 12a, 12b may be operated based on the estimating process in the entire region from the lowest rotational speed NEL to the highest rotational speed NEH.

Regarding Pump Operating Process

In the above-illustrated embodiments, the feed pump 32 is operated to feedback-control the average value Pc to be equal to the target value Pc*, but the present disclosure is not limited to this. For example, the feed pump 32 may be operated by an open loop control.

Regarding Order of Injections

In the above-illustrated embodiments, fuel injection is executed alternately between the first bank and the second bank by causing one of a port injection valve 12a of the first bank and a port injection valve 12b of the second bank to inject fuel before fuel is injected by the other. However, the present disclosure is not limited to this. Experiments conducted by the inventors using the actual equipment demonstrated that, even if the order of injections is changed, the pressure pulsations are in antiphase between the first bank and the second bank as long as the low-pressure delivery pipe resonance occurs.

Figure 12A:
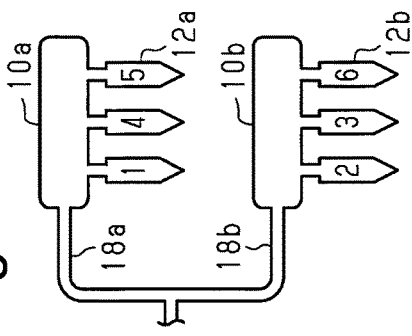
FIGS. 12A and 12B are diagrams showing modifications.

FIG. 12A shows an example in which the order of injection is changed such that the second injection cylinder and the third injection cylinder are provided in the second bank, and the fourth injection cylinder and the fifth injection cylinder are provided in the first bank. In this case, in the rotational speed region in which the above first-order resonance occurs, the pressure pulsation caused by the fuel injection by the first injection cylinder and the pressure pulsation caused by the fuel injection by the second injection cylinder intensify each other, but the pressure pulsations caused by the third and fourth injection cylinders weaken each other. However, the pressure pulsation due to the fuel injection by the first injection cylinder is intensified by both of the pressure pulsation caused by the fuel injection by the fifth injection cylinder and the fuel injection by the sixth injection cylinder. Thus, there are three cylinders that intensify the pressure pulsation due to fuel injection by the first injection cylinder, and there are two cylinders that weaken the pressure pulsation. In total, the fuel injection by the first injection cylinder and the fuel injection by one other cylinder intensify each other. Accordingly, the pressure pulsation caused by the fuel injection by the first injection cylinder and the pressure pulsation caused by the combustion injection by another cylinder intensify each other. Therefore, a first-order resonance occurs, in which case the phase of the pressure pulsation in the first bank and that in the second bank are in antiphase. The cycle of the pressure pulsation at this time is determined in accordance with the minimum value of the interval of fuel injection in each of the first bank and the second bank. That is, in the first bank, the cycle of the pressure pulsation is determined in accordance with the interval of fuel injection between the fourth injection cylinder and the fifth cylinder. In the second bank, the cycle of the pressure pulsation is determined in accordance with the interval of fuel injection between the second injection cylinder and the third cylinder. The minimum value of the fuel injection interval is the minimum value of the interval between the rotation angles of the compression top dead centers of two cylinders in each bank in which fuel injection is executed successively.

Figure 12B:
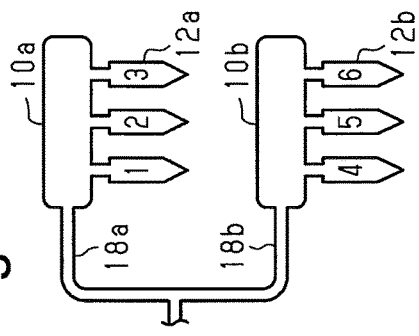

FIG. 12B is an example in which fuel injection by the port injection valve $12b$ of each cylinder in the second bank is executed after fuel injection by the port injection valve $12a$ of each cylinder in the first bank is completed. In this case, in the rotational speed region in which the above first-order resonance occurs, the pressure pulsation caused by the fuel injection by the first injection cylinder and the pressure pulsation caused by the fuel injection by the second injection cylinder weaken each other, but the pressure pulsations caused by the third and fourth injection cylinders intensify each other. The pressure pulsation caused by fuel injection by the first injection cylinder is weakened by a pressure pulsation caused by fuel injection by the fifth injection cylinder, but intensified by the pressure pulsation caused by fuel injection by the sixth injection cylinder. Thus, there are three cylinders that intensify the pressure pulsation due to fuel injection by the first injection cylinder, and there are two cylinders that weaken the pressure pulsation. In total, the fuel injection by the first injection cylinder and the fuel injection by one other cylinder intensify each other. Accordingly, the pressure pulsation caused by the fuel injection by the first injection cylinder and the pressure pulsation caused by the combustion injection by another cylinder intensify each other. Therefore, a first-order resonance occurs, in which case the phase of the pressure pulsation in the first bank and that in the second bank are in antiphase. The cycle of the pressure pulsation at this time is determined in accordance with the minimum value of the interval of fuel injection in each of the first bank and the second bank. The minimum value of the fuel injection interval is the minimum value of the interval between the rotation angles of the compression top dead centers of two cylinders in which fuel injection is executed successively.

In the above-illustrated embodiments, the pressure pulsation due to the fuel injection of the first injection cylinder is intensified by the pressure pulsation caused by the combustion injection by all the other cylinders. Thus, compared to the examples shown in FIGS. 12A and 12B, the pressure pulsation when the first-order resonance phenomenon occurs is large. This fact has been demonstrated by experiments conducted by the inventors using the actual equipment.

As described above, when a low-pressure delivery pipe resonance occurs, the pressure pulsation of the first bank and the pressure pulsation of the second bank are in antiphase at least when the intervals of fuel injection between the cylinders of temporally sequential compression top dead centers are all the same. However, antiphase occurs not only when the intervals of fuel injection between the cylinders of sequential compression top dead centers are all the same. For example, in the above-illustrated embodiments, the first-order low-pressure delivery pipe resonance can occur even if the fuel injection by the third injection cylinder is stopped. Even in this case, the cycle of the pressure pulsation is determined in accordance with the minimum value of the fuel injection interval in the second bank. The pressure pulsation is half the fuel injection interval in the first bank and determined in accordance with the fuel injection interval in the first bank.

Regarding First Fuel Storage Member and Second Fuel Storage Member

In the above-illustrated embodiments, the low-pressure delivery pipes $10a$, $10b$ are made of metal. However, the low-pressure delivery pipes $10a$, $10b$ may be made of plastic, for example. Even in this case, the stiffness of the low-pressure delivery pipes $10a$, $10b$ is higher than that of the first low-pressure fuel passage $18a$ and the second low-pressure fuel passage $18b$, and the propagation speed of pressure in the low-pressure delivery pipes $10a$, $10b$ is sufficiently higher than the propagation speed of pressure in the first low-pressure fuel passage $18a$ and the second low-pressure fuel passage $18b$. It should be noted, however, that the pressure propagation speed in the low-pressure delivery pipes $10a$, $10b$ does not necessarily need to be sufficiently higher than the pressure propagation speed in the first low-pressure fuel passage $18a$ and the second low-pressure fuel passage $18b$. For example, in a case in which these propagation speeds are equal to each other, if the pressure pulsation due to the fuel injection by the first injection cylinder and the pressure pulsation due to the fuel injection by the second injection cylinder intensify each other in the phenomenon described using FIGS. 3A to 3C, it is possible that the first injection cylinder and the pressure pulsation due to the fuel injection by the third injection cylinder will not intensify each other. Even in this case, a resonance phenomenon occurs.

Regarding Internal Combustion Engine

The internal combustion engine of the above-illustrated embodiments does not necessarily need to be a V6 engine, but may be a V8 engine. In this case, if fuel is injected alternately between the first bank and the second bank, for example, the fuel injection cycle in the first bank is 180° CA. Thus, the pulsation cycle coefficient c is set 2 in the rotational speed region in which the low-pressure delivery pipe resonance occurs. Furthermore, the internal combustion engine of the above-illustrated embodiments does not necessarily need to be a V engine, but may be a horizontally-opposed engine.

Regarding Fuel Injection Control Device

The fuel injection control device is not limited to a device that includes the CPU 62 and the ROM 64 and executes software processing. For example, at least part of the processes performed by software in the above-illustrated embodiments may be performed by hardware circuits dedicated to executing these processes (such as ASIC). That is, the fuel injection control device may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and/or a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Other

The target value of the pressure in the low-pressure delivery pipes 10a, 10b does not necessarily need to be set variably.

The invention claimed is:

1. A fuel injection control device for an internal combustion engine, wherein
the internal combustion engine includes
a first bank having a first cylinder,
a second bank having a second cylinder,
a first fuel injection valve configured to supply fuel to the first cylinder,
a second fuel injection valve configured to supply fuel to the second cylinder,
a first fuel storage member, which is connected to the first fuel injection valve and is configured to store fuel to be supplied to the first fuel injection valve,
a second fuel storage member, which is connected to the second fuel injection valve and is configured to store fuel to be supplied to the second fuel injection valve, wherein the second fuel storage member is different from the first fuel storage member and communicates with the first fuel storing member, and
a pressure sensor configured to detect a fuel pressure in the first fuel storage member,
the fuel injection control device comprises processing circuitry that is configured to execute:
an estimating process to estimate fuel pressure in the first fuel storage member and fuel pressure in the second fuel storage member; and
an injection valve operating process to operate the first and second fuel injection valves such that, when pressure in a fuel injection period that is the pressure estimated in the estimating process is high, the fuel injection period is shorter than when the pressure in the fuel injection period is low,
the estimating process includes an antiphase estimating process, which includes
estimating the fuel pressure in the first fuel storage member based on a detection value of the pressure sensor and a cycle of pulsation in the first fuel storage member, which is determined in accordance with an interval of fuel injections in the first bank, and
estimating the fuel pressure in the second fuel storage member by assuming that a phase of a periodic fluctuation of the fuel pressure in the second fuel storage member and a phase of a periodic fluctuation of the fuel pressure in the first fuel storage member are in antiphase.

2. The fuel injection control device according to claim 1, wherein
the processing circuitry is configured to execute a speed acquiring process to acquire a rotational speed of a crankshaft of the internal combustion engine, and
the processing circuitry is configured to use the pressure estimated in the antiphase estimating process in the injection valve operating process on condition that the rotational speed acquired in the speed acquiring process is in a predetermined range.

3. The fuel injection control device according to claim 2, wherein
the internal combustion engine includes a feed pump that supplies fuel to the first fuel storage member and the second fuel storage member, and
the processing circuitry is configured to execute
a target value varying process to variably set a target value of the pressure in the first and second fuel storage members,
a pump operating process to operate the feed pump, thereby controlling the pressure in the first and second fuel storage members to become the target value, and
a range varying process to set the predetermined range to a higher rotational speed range when the pressure in the first and second fuel storage members is high than when the pressure is low.

4. The fuel injection control device according to claim 2, wherein the processing circuitry is configured to execute
a temperature acquiring process to acquire a temperature of the fuel, and
a range varying process to set the predetermined range to a higher rotational speed range when the temperature is low than when the temperature is high.

5. The fuel injection control device according to claim 2, wherein
the first fuel injection valve is a first port injection valve that is configured to inject fuel into an intake passage of the internal combustion engine,
the second fuel injection valve is a second port injection valve that is configured to inject fuel into the intake passage,
the internal combustion engine includes
a first direct injection valve, which is configured to inject fuel into a combustion chamber of the first cylinder,
a first high-pressure storage member, which is connected to the first direct injection valve and configured to store fuel to be supplied to the first direct injection valve,
a second direct injection valve, which is configured to inject fuel into a combustion chamber of the second cylinder,
a second high-pressure storage member, which is connected to the second direct injection valve and configured to store fuel to be supplied to the second direct injection valve, and
a high-pressure fuel pump, which is configured to supply the fuel under high pressure to the first high-pressure storage member such that the fuel pressure in the first high-pressure storage member becomes higher than the fuel pressure in the first fuel storage member, and supply the fuel under high pressure to the second high-pressure storage member such that the fuel pressure in the second high-pressure storage member becomes higher than the fuel pressure in the second fuel storage member,
a rotational speed region in which a resonance occurs due to propagation of a pressure pulsation caused by fuel injection by the first and second port injection valves between the first and second fuel storage members is defined as a low-pressure resonance region, a rotational speed region in which a resonance occurs due to reflection of a pressure pulsation caused by operation of the high-pressure fuel pump at the first and second fuel storage members is defined as a high-pressure pump-induced resonance region, the low-pressure resonance region and the high-pressure pump-induced resonance region do not overlap with each other, the predetermined range is set in the low-pressure resonance region, the processing circuity is configured to execute the antiphase estimating process in the predetermined range, the estimating process includes a same-phase estimating process, which includes estimating, in the high-pressure pump-induced resonance region, the fuel pressure in the first fuel storage member based on a detection value of the pressure sensor and a cycle of pulsation in the first fuel storage member, which is determined in accordance with a cycle of operation of the high-pressure fuel pump, and estimating that a phase of a periodic fluctuation of the fuel pressure in the second fuel storage member and a phase of a periodic fluctuation of the fuel pressure in the first fuel storage member are in the same phase, and the injection valve operating process includes operating the first and second port injection valves such that, in the high-pressure pump-induced resonance region, when pressure in the fuel injection period that is the pressure estimated in the same-phase estimating process is high, the fuel injection period is shorter than when the pressure in the fuel injection period is low.

6. The fuel injection control device according to claim 5, wherein the high-pressure fuel pump includes a first high-pressure fuel pump, which is configured to supply the fuel under high pressure to the first high-pressure storage member, and a second high-pressure fuel pump, which is configured to supply the fuel under high pressure to the second high-pressure storage member, each of the first and second high-pressure fuel pumps includes a discharge metering valve, which is configured to adjust a discharge amount by permitting at least some of drawn-in fuel to be discharged back, and the first and second high-pressure fuel pumps are configured such that, when one of the first and second high-pressure fuel pumps is in a stroke of drawing in fuel, the other discharges fuel.

7. A fuel injection control method for an internal combustion engine, wherein the internal combustion engine includes a first bank having a first cylinder, a second bank having a second cylinder, a first fuel injection valve configured to supply fuel to the first cylinder, a second fuel injection valve configured to supply fuel to the second cylinder, a first fuel storage member, which is connected to the first fuel injection valve and is configured to store fuel to be supplied to the first fuel injection valve, a second fuel storage member, which is connected to the second fuel injection valve and is configured to store fuel to be supplied to the second fuel injection valve, wherein the second fuel storage member is different from the first fuel storage member and communicates with the first fuel storing member, and a pressure sensor configured to detect a fuel pressure in the first fuel storage member, the fuel injection control method comprises:

executing an estimating process to estimate fuel pressure in the first fuel storage member and fuel pressure in the second fuel storage member; and executing an injection valve operating process to operate the first and second fuel injection valves such that, when pressure in a fuel injection period that is the pressure estimated in the estimating process is high, the fuel injection period is shorter than when the pressure in the fuel injection period is low, the estimating process includes estimating the fuel pressure in the first fuel storage member based on a detection value of the pressure sensor and a cycle of pulsation in the first fuel storage member, which is determined in accordance with an interval of fuel injections in the first bank, and estimating the fuel pressure in the second fuel storage member by assuming that a phase of a periodic fluctuation of the fuel pressure in the second fuel storage member and a phase of a periodic fluctuation of the fuel pressure in the first fuel storage member are in antiphase.

8. A non-transitory computer readable medium that stores a program for causing a processor to execute a fuel injection control process for an internal combustion engine, wherein the internal combustion engine includes a first bank having a first cylinder, a second bank having a second cylinder, a first fuel injection valve configured to supply fuel to the first cylinder, a second fuel injection valve configured to supply fuel to the second cylinder, a first fuel storage member, which is connected to the first fuel injection valve and is configured to store fuel to be supplied to the first fuel injection valve, a second fuel storage member, which is connected to the second fuel injection valve and is configured to store fuel to be supplied to the second fuel injection valve, wherein the second fuel storage member is different from the first fuel storage member and communicates with the first fuel storing member, and a pressure sensor configured to detect a fuel pressure in the first fuel storage member, the fuel injection control process includes:

an estimating process to estimate fuel pressure in the first fuel storage member and fuel pressure in the second fuel storage member; and an injection valve operating process to operate the first and second fuel injection valves such that, when pressure in a fuel injection period that is the pressure estimated in the estimating process is high, the fuel injection period is shorter than when the pressure in the fuel injection period is low, the estimating process includes estimating the fuel pressure in the first fuel storage member based on a detection value of the pressure sensor and a cycle of pulsation in the first fuel storage member, which is determined in accordance with an interval of fuel injections in the first bank, and estimating the fuel pressure in the second fuel storage member by assuming that a phase of a periodic fluctuation of the fuel pressure in the second fuel storage member and a phase of a periodic fluctuation of the fuel pressure in the first fuel storage member are in antiphase.

\* \* \* \* \*